(12) United States Patent
Westhues et al.

(10) Patent No.: US 8,766,931 B2
(45) Date of Patent: Jul. 1, 2014

(54) CAPACITIVE TOUCH SENSOR HAVING CODE-DIVIDED AND TIME-DIVIDED TRANSMIT WAVEFORMS

(75) Inventors: Jonathan Westhues, New York, NY (US); Jefferson Y. Han, Holliswood, NY (US)

(73) Assignee: Perceptive Pixel Inc., New York, NY (US)

( * ) Notice: Subject to any disclaimer, the term of this patent is extended or adjusted under 35 U.S.C. 154(b) by 284 days.

(21) Appl. No.: 12/838,419

(22) Filed: Jul. 16, 2010

(65) Prior Publication Data

US 2012/0013546 A1 Jan. 19, 2012

(51) Int. Cl.
*G06F 3/041* (2006.01)
*G06F 3/044* (2006.01)
*G08C 21/00* (2006.01)

(52) U.S. Cl.
USPC ........................................ 345/173; 178/18.06

(58) Field of Classification Search
USPC ................... 345/173–178; 178/18.03
See application file for complete search history.

(56) References Cited

U.S. PATENT DOCUMENTS

| | | | |
|---|---|---|---|
| 4,672,154 A | 6/1987 | Rodgers et al. | |
| 5,606,346 A | 2/1997 | Kai et al. | |
| 6,002,389 A | 12/1999 | Kasser | |
| 6,175,773 B1 * | 1/2001 | Reiffel et al. | 700/56 |
| 7,342,561 B2 * | 3/2008 | Hiraki et al. | 345/87 |
| 2002/0185981 A1 | 12/2002 | Dietz et al. | |
| 2002/0185999 A1 | 12/2002 | Tajima et al. | |
| 2003/0063073 A1 | 4/2003 | Geaghan et al. | |
| 2006/0161870 A1 | 7/2006 | Hotelling et al. | |
| 2006/0161871 A1 | 7/2006 | Hotelling et al. | |
| 2007/0029484 A1 * | 2/2007 | Anderson et al. | 250/338.1 |
| 2008/0157893 A1 * | 7/2008 | Krah | 331/177 R |
| 2008/0291176 A1 * | 11/2008 | Ito | 345/174 |
| 2009/0009483 A1 | 1/2009 | Hotelling et al. | |
| 2009/0127005 A1 * | 5/2009 | Zachut et al. | 178/18.03 |
| 2009/0135148 A1 | 5/2009 | Bytheway | |
| 2009/0244029 A1 | 10/2009 | Huang et al. | |
| 2009/0284495 A1 | 11/2009 | Geaghan et al. | |
| 2010/0026656 A1 * | 2/2010 | Hotelling et al. | 345/174 |
| 2010/0026664 A1 | 2/2010 | Geaghan | |
| 2010/0060593 A1 | 3/2010 | Krah | |
| 2010/0073325 A1 | 3/2010 | Yang | |
| 2010/0085326 A1 | 4/2010 | Anno | |

(Continued)

FOREIGN PATENT DOCUMENTS

| | | |
|---|---|---|
| EP | 1956469 A2 | 8/2008 |
| EP | 2024974 A2 | 4/2009 |
| GB | 2428094 A | 1/2007 |
| WO | WO9718528 A1 | 5/1997 |

OTHER PUBLICATIONS

Uchimura et al., "Oversampling A-to-D and D-to-A Converters with Multistage Noise Shaping Modulators," IEEE Transactions on Acoustics, Speech, and Signal Processing, vol. 36, No. 12, Dec. 1, 1988, 10 pages.

(Continued)

*Primary Examiner* — Alexander S Beck
*Assistant Examiner* — Nguyen H Truong
(74) *Attorney, Agent, or Firm* — Glen Johnson; Micky Minhas

(57) ABSTRACT

Methods, systems, and apparatus, including computer programs encoded on a computer storage medium, for digital signal processing (DSP) techniques for generally improving a signal-to-noise ratio (SNR) of capacitive touch sensors.

32 Claims, 18 Drawing Sheets

(56) References Cited

U.S. PATENT DOCUMENTS

| | | |
|---|---|---|
| 2010/0107099 A1 | 4/2010 | Frazier et al. |
| 2010/0144391 A1 | 6/2010 | Chang et al. |
| 2010/0156805 A1 | 6/2010 | Brand et al. |
| 2011/0031042 A1* | 2/2011 | Wu et al. .................... 178/18.06 |
| 2011/0042152 A1* | 2/2011 | Wu ............................ 178/18.03 |
| 2011/0063993 A1* | 3/2011 | Wilson et al. ................. 370/254 |
| 2011/0148806 A1* | 6/2011 | Oda et al. ...................... 345/174 |

OTHER PUBLICATIONS

Notification of Transmittal of International Search Report and the Written Opinion of the International Searching Authority, or the Declaration dated Jan. 6, 2012 from International Application No. PCT/US2011/043935, 13 pages.

Notification of Transmittal of International Search Report and the Written Opinion of the International Searching Authority, or the Declaration dated Dec. 21, 2011 from International Application No. PCT/US2011/043936, 16 pages.

Invitation to Pay Additional Fees and, where Applicable, Protest Fee, including Communication Relating to the Results of the Partial International Search dated Dec. 20, 2011 from International Application No. PCT/US2011/043937, 9 pages.

Invitation to Pay Additional Fees and, where Applicable, Protest Fee, including Communication Relating to the Results of the Partial International Search dated Dec. 22, 2011 from International Application No. PCT/US2011/047844. 9 pages.

Notification of Transmittal of International Search Report and the Written Opinion of the International Searching Authority, or the Declaration dated Mar. 6, 2012 from International Application No. PCT/2011/043937, 19 pages.

Notification of Transmittal of International Search Report and the Written Opinion of the International Searching Authority, or the Declaration dated Mar. 6, 2012 from International Application No. PCT/2011/047844, 24 pages.

Notification of Transmittal of International Search Report and the Written Opinion of the International Searching Authority, or the Declaration dated May 15, 2012 from International Application No. PCT/2012/023915, 15 pages.

DiamondTouch by Circle Twelve, downloaded from the internet on Aug. 27, 2010, at http://circletwelve.com/products/howitworks.html, 2 pages.

* cited by examiner

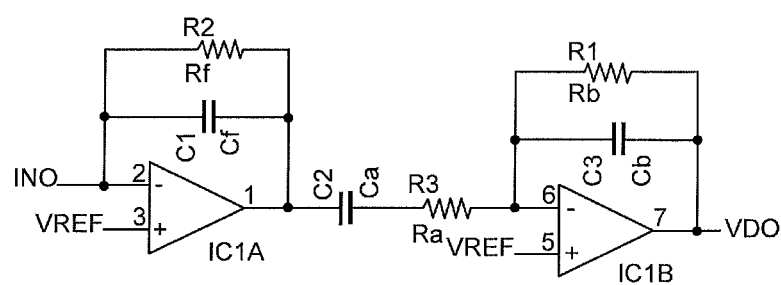
FIG. 14A    1400

CAPACITIVE TOUCH SENSOR HAVING CODE-DIVIDED AND TIME-DIVIDED TRANSMIT WAVEFORMS

TECHNICAL FIELD

This disclosure relates to digital signal processing (DSP) techniques and implementations to improve the signal-to-noise ratio (SNR) of capacitive touch sensors.

BACKGROUND

In some touch sensors, the location of a user's finger within a two-dimensional surface can be determined by making measurements of capacitance. The user's finger can be somewhat conductive, and the user can have some connection to the touch sensor circuit's ground so that the user's finger has an effect upon the capacitance between electrodes in the touch sensor.

SUMMARY

This specification describes technologies generally relating to touch sensors employing DSP techniques for enhancing SNR.

In general, some aspects of the subject matter described in this specification can be embodied in methods that involve a sensor. Other embodiments of this aspect include corresponding systems, apparatus, and computer programs, configured to perform the actions of the methods, encoded on computer storage devices.

In general, another aspect of the subject matter described in this specification can be embodied in methods that include the actions related to a data processing apparatus associated with a sensor having a front end interface, at least one trace line, at least one transmitter coupled with both the front end interface and a first location on at least one of the trace lines, and a receiver coupled with a second location on at least the one trace line. The method involves accessing a signal at the front end interface of the sensor, transmitting the accessed signal from the transmitter to the first location on at least one of the trace lines of the sensor to promote transmission of the accessed signal along the trace line corresponding to the first location to which the accessed signal is transmitted, and receiving, at the receiver of the sensor and from the trace line through the receiver coupled with the second location of the trace line of the sensor, the accessed and transmitted signal. The method involves accessing a distance between the first location of transmitter and the second location of receiver along the trace line used to transmit the accessed signal, determining, based on the accessed distance, a transformation that the transmitted signal is expected to experience based on the transmission as a function of the distance between the first and second locations, and generating an expected correlation signal based on the determined transformation. The method includes receiving the expected correlation signal at the receiver of the sensor, and based on the expected correlation signal received, identifying information that can be used to at least partially compensate for the transformation that the transmitted signal is expected to experience based on the transmission. The method includes compensating, by applying the expected correlation signal received, for least part of the transformation that the transmitted signal is expected to experience based on the transmission.

These and other embodiments can each optionally include one or more of the following features. The expected correlation signal can correspond to correlation information corresponding to an analog signal and/or digital data. The transformation can include a phase shift. The transformation can also include an attenuation, delay, and/or a linear filtering effect. The transformation can be applied to a sinusoidal waveform for the expected correlation signal or a non-sinusoidal waveform for the expected correlation signal. The compensating can involve computing a product of a waveform of the received transmitted signal against a waveform of the expected correlation signal over an integration period, and computing an integral of the product. The method can include providing the computation at an output of the receiver. The sensor can have trace lines in a matrix configuration. The method can include modeling the transformation of the received transmitted signal as a function of the distance between the transmitter and the receiver in the matrix configuration. The method can involve modeling the transformation by modeling at least the one trace line as having a distributed resistance and capacitance along the distance between the first and second locations. For determining the transformation that the transmitted signal is expected to experience, the method can involve measuring a set of transformations along the distance between the first and second locations, and selecting one of the transformations in the set of transformations that approximates the transformation that the transmitted signal is expected to experience, for which the transformation can include a phase shift, and the set of transformations comprises a set of phase shifts. The transformation that the transmitted signal is expected to experience can include measuring a respective phase shift along respective locations along at least the one trace line, selecting one of the measured phase shifts based on matching the distance relating to one of the measured phase shifts with the distance between the first and second locations, and assigning the selected measured phase shift as the phase shift that the transmitted signal is expected to experience. For determining the transformation that the transmitted signal is expected to experience, the method can include measuring a respective phase shift along respective locations along at least the one trace line, utilizing linear interpolation of the measured phase shifts to approximate the phase shift that the transmitted signal is expected to experience at the second location at the receiver, and assigning the interpolated phase shift as the phase shift that the transmitted signal is expected to experience. For determining the transformation that the transmitted signal is expected to experience, the method can involve correlating against an in-phase version and a quadrature-phase version of a waveform of the transmitted signal, and computing the phase shift that the transmitted signal is expected to experience by computing a function of an arctangent of the in-phase and quadrature-phase waveforms. The sensor can have trace lines in a matrix configuration, where the transmitting can involve driving the sensor with the transmitted signal at two edges of the matrix to reduce a resistance-capacitance time constant by two when compared to a time constant derived from driving the sensor with the transmitted signal at one edge. The transmitting can involve driving the sensor with the transmitted signal at multiple edges of the matrix to reduce a resistance-capacitance time constant when compared to a time constant derived from driving the sensor with the transmitted signal at one edge. A number of multiple edges can be four, for which the resistance-capacitance time constant can be reduced by four when compared to the time constant derived from driving the sensor with the transmitted waveform at one edge. The sensor can have trace lines formed in a matrix configuration with rows and columns, for which at least one trace line in at least one of the rows or at least one of the columns is split to form two trace lines that are about half a length of the one trace line, and the split trace line forms a first section of the trace line corresponding to a first part of the split trace line and a second section of the trace line corresponding to the second part of the split trace line. A resistance-capacitance time constant for either the first or second split trace lines can be a function of a length of the first or second trace lines. The sensor can be a capacitive touch sensor.

In general, another aspect of the subject matter described in this specification can be embodied in methods that include the actions related to a data processing apparatus associated with a sensor, for which the sensor includes trace lines oriented in a matrix configuration, a front end interface, transmitters coupled with the front end interface, and receivers. The respective transmitters correspond to and are coupled with a first location of respective trace lines, and the respective receivers are coupled with a second location of the respective trace lines. The method involves determining orthogonal excitation waveforms having an orthogonal waveform sequence, where the orthogonal excitation waveforms are orthogonal to each other, and simultaneously transmitting, on each of at least two of the transmitters, one of the orthogonal excitation waveforms such that at least two of the transmitters are configured to transmit respective orthogonal waveform sequences, where the transmitting occurs on less than all transmitters in the sensor. The method involves receiving at least two of the orthogonal excitation waveforms at least at two of the receivers, for which each of the at least two orthogonal excitation waveforms are received at one of the respective receivers. The method includes receiving information for at least an expected received waveform, and for each of the at least two receivers, correlating the received excitation waveform against the expected received waveform.

These and other embodiments can each optionally include one or more of the following features. The sensor can include a capacitive touch sensor. The orthogonal excitation waveforms are orthogonal to noise in the sensor. The matrix configuration can include n columns of trace lines, and each simultaneous transmission of the transmitters can occur in an integration time. The method can involve determining a number of integration times as a function of a number of simultaneous transmissions from at least two of the transmitters. The method can involve identifying a frequency associated with noise in the sensor, and selecting at least one of the orthogonal excitation waveforms to be orthogonal to the frequency associated with the noise. The sensor can be configured to be located within a physical proximity to a liquid crystal display to at least have an ability to interact with the liquid crystal display. The liquid crystal display can have a scan line frequency that is about 30 kHz to 135 kHz. The method can involve performing code division multiplexing, where each trace line in a group of four trace lines comprises a distinct code for the orthogonal waveform sequences. The code division multiplexing can be a Manchester-coded Hadamard sequence. The method of determining the orthogonal excitation waveforms can involve selecting a first frequency for modulation, generating a pseudo-noise sequence around the first frequency, generating a carrier signal for the pseudo-noise sequence, and modulating a number of cycles of the carrier signal around the first frequency with the pseudo-noise sequence. The first frequency can be around 100 kHz. The number of carrier signals can be less than ten. The method can involve identifying a frequency associated with the identified noise, and selecting at least one of the orthogonal excitation waveforms to be orthogonal to the frequency associated with the identified noise. The determined orthogonal excitation waveforms can be a function of both a frequency for modulation and a pseudo-noise sequence at the frequency for modulation. The method can involve taking a noise spectrum associated with the sensor, taking a measurement of noise in the sensor by evaluating the noise spectrum associated with the sensor, identifying the noise based on the evaluation of the noise spectrum, and determining the orthogonal excitation waveforms by making the orthogonal excitation waveforms orthogonal to the identified noise in the sensor. The method can involve taking a noise spectrum associated with the sensor, taking a measurement of the noise by evaluating the noise spectrum associated with the sensor, and performing the identification of the noise based on the measurement of the noise. The method can involve continuing to take the measurement to identify the noise that is orthogonal to the orthogonal excitation waveforms by identifying the noise from the highest noise source in the noise spectrum over a time frame, and adaptively determining the orthogonal excitation waveforms by using the noise associated with the highest noise source that is continuously identified in the noise spectrum. The method can involve periodically taking the measurement to identify the noise that is orthogonal to the orthogonal excitation waveforms by identifying the noise from the highest noise source in the noise spectrum, and adaptively determining the orthogonal excitation waveforms by using the noise associated with the highest noise source that is periodically identified in the noise spectrum. The identified noise can be associated with a frequency of operation of a cold-cathode fluorescent backlight or a frequency associated with a liquid crystal display.

The sensor can be a capacitive touch sensor. The capacitive touch sensor can have a front-end circuit. The method can include preparing an input voltage for transmitting at an output of the front-end circuit for the capacitive touch sensor, where the front-end circuit can include at least a two-stage circuit with the first stage being configured to produce a transimpedance gain, and the second stage can be configured to produce a voltage gain. The preparation of the input voltage can include producing the transimpedance gain in the first stage of the front-end circuit by configuring the first stage as an integrator circuit. The method can include generating an output signal at the first stage by performing voltage division of the input voltage, and amplifying the output signal of the first stage of the front-end circuit with the voltage gain of the second stage of the front-end circuit to produce an output signal for the second stage of the front-end circuit. The identified noise can include a main noise source of the sensor, where the identified noise can be associated with a liquid crystal display frequency or a frequency of operation of a cold-cathode fluorescent backlight. The first stage can include the noise at a noise level such that the output signal for the second stage of the front-end circuit can include the noise of the first stage amplified by a function of the voltage gain of the second stage. The noise at the output signal of the second stage can be less than the main noise source of the sensor. The first stage can include noise at a noise level such that the output signal for the second stage of the front-end circuit includes the noise of the first stage amplified by a function of the voltage gain of the second stage, and the noise at the output signal of the second stage can be less than noise of the sensor that is derived from the liquid crystal display frequency or the frequency of operation of the cold-cathode fluorescent backlight. A closed-loop transfer function of the front-end circuit can be stable.

In general, another aspect of the subject matter described in this specification can be embodied in methods that include the actions related to a data processing apparatus associated with a capacitive touch sensor, where the sensor includes trace lines arranged in rows and columns with a matrix configuration. The method includes conducting a first scan including scanning the columns of the capacitive touch sensor in an interlace pattern, where the interlace pattern includes a frame, and where the frame comprises n number of subframes, for which n is an integer. The method includes using information generated as a consequence of the first scan to identify areas of the sensor that experienced a change in a capacitance from a row to a column, using the detection of the areas of the sensor that experienced the change in the capacitance to inform selection of a subset of columns upon which to focus a second and subsequent scan, and scanning the subset of columns selected for the second and subsequent scan. The scanning of the subset of columns can involve determining a signal level and a noise level for the second scan, and determining a signal-to-noise ratio based on the signal level and the noise level determined for the second scan and relating to the areas of the sensor that had the change in capacitance.

These and other embodiments can each optionally include one or more of the following features. The first scan can include determining a signal level and a noise level for the first scan, and determining a signal-to-noise ratio based on the signal level and the noise level determined for the first scan. The method can involve receiving signals for the first and second scans, and determining a combined signal-to-noise ratio that is higher than the signal-to-noise ratios associated with the first or second scans by averaging the signals that are received for the first and second scans. The value of n can be equal to 4, for example. The frame can be configured to be at around 30 Hz and the subframes can be at around 120 Hz, where the interlace pattern can include 16 columns per frame and 4 columns per subframe. A latency of the sensor can be about 120 Hz. The row to the column capacitance can involve a fringing capacitance.

In general, another aspect of the subject matter described in this specification can be embodied in methods that include the actions related to a data processing apparatus associated with a capacitive touch sensor. The sensor includes trace lines arranged in rows and columns with a matrix configuration. The method involves conducting a first scan including scanning the columns of the capacitive touch sensor in an interlace pattern, where the interlace pattern includes a frame, wherein the frame comprises n number of subframes, where n is an integer, and using information generated as a consequence of the first scan to identify areas of the sensor that experienced a change in a capacitance from a row to a column. The method includes using the detection of the areas of the sensor that experienced the change in the capacitance to inform selection of a subset of columns upon which to focus a second and subsequent scan, and scanning the subset of columns selected for the second and subsequent scan, wherein the first scan is associated with a first measurement, where the second scan is associated with a second measurement. The scanning of the subset of columns involves determining a target signal level and a noise level for the second scan, determining a target signal to noise ratio, and determining an integration period to achieve the target signal to noise ratio by utilizing a function that is an average of the second measurement and the first measurement.

These and other embodiments can each optionally include one or more of the following features. The first scan can include determining a signal level and a noise level for the first scan, and determining a target signal-to-noise ratio based on the signal level and the noise level determined for the first scan. The method can include receiving signals for the first and second scans, and determining a signal with a signal-to-noise ratio that is higher than the signal-to-noise ratios associated with the first or second scans by averaging the signals that are received for the first and second scans. The value of n can be equal to about 4. The frame can be configured to be at about 30 Hz and the subframes can be at about 120 Hz, where the interlace pattern can include 16 columns per frame and 4 columns per subframe. A latency of the sensor can be about 120 Hz, and the row to the column capacitance can include a fringing capacitance.

In general, another aspect of the subject matter described in this specification can be embodied in methods that include the actions related to a data processing apparatus associated with a capacitive touch sensor, where the sensor includes trace lines arranged in rows and columns with a matrix configuration, and the columns are arranged as n sets of columns, and n is an integer. The method involves sequentially conducting a first scan of each of the n sets of columns of the capacitive touch sensor in an interlace pattern, using information generated as a consequence of the first scan to identify areas of the sensor that experienced a change in a fringing capacitance, the fringing capacitance comprising a capacitance from a row to a column, and using the detection of the areas of the sensor that experienced the change in the capacitance to inform selection of a subset of each of the n sets of columns upon which to focus a second and subsequent scan according. The method involves scanning the subset of each of the n sets of columns selected for the second and subsequent scan, where the first scan is associated with a first measurement, and the second scan is associated with a second measurement. The scanning of the each subset of the n sets of columns involves determining a signal level and a noise level for the second scan, determining a target signal to noise ratio, and determining an integration period to achieve the target signal to noise ratio by utilizing a function that is an average of the second measurement and the first measurement. For each set of columns and corresponding subsets of columns in the n sets of columns, the first scan and the second scan are conducted before commencing scanning on a subsequent set of columns and corresponding subsets of columns.

These and other embodiments can each optionally include one or more of the following features. For each subset of the n sets of columns, the method can involve the following techniques: scanning the subset of columns in the integration period; obtaining the second measurement related to received signals of the scan of the subset of columns, where the second measurement is related to a second measurement-derived signal-to-noise ratio; determining whether the subset of columns are configured to have at least a minimum signal-to-noise ratio; determining, on the basis of the second measurement-derived signal-to-noise ratio, whether the second measurement-derived signal-to-noise ratio is less than the minimum signal-to-noise ratio for the subset of columns; and upon determining that the second measurement-derived signal-to-noise ratio is less than the minimum signal-to-noise ratio for the subset of columns, performing another scan of the subset of columns; obtaining another measurement related to received signals of the other scan of the subset of columns, and averaging the measurement and the other measurement of the subset of columns to produce a combined measurement that has a property where a signal-to-noise ratio related to the combined measurement is higher than the signal-to-noise ratio related to either of the measurements of the subset of columns.

In general, another aspect of the subject matter described in this specification can be embodied in methods that include the actions related to a data processing apparatus associated with a capacitive touch sensor, where the sensor includes trace lines arranged in rows and columns with a matrix configuration, and the columns are arranged as n sets of columns, for where n is an integer. The method involves sequentially conducting a first scan of each of the n sets of columns of the capacitive touch sensor in an interlace pattern, and using information generated as a consequence of the first scan to identify areas of the sensor that experienced a change in a fringing capacitance, for which the fringing capacitance includes a capacitance from a row to a column. The method involves using the detection of the areas of the sensor that experienced the change in the capacitance to inform selection of a subset of each of the n sets of columns upon which to focus a second and subsequent scan according, and scanning the subset of each of the n sets of columns selected for the second and subsequent scan. The scanning of the each subset of the n sets of columns can include determining a signal level and a noise level for the second scan, and determining a signal-to-noise ratio based on the signal level and the noise level determined for the second scan and relating to the areas of the sensor that had the change in capacitance. For each set of columns and corresponding subsets of columns in the n sets of columns, the first scan and the second scan are conducted before commencing scanning on a subsequent set of columns and corresponding subsets of columns.

These and other embodiments can each optionally include one or more of the following features. For each subset of the n sets of columns, the method can involve scanning the subset of columns in an integration period, obtaining a measurement of a signal-to-noise ratio related to the scan of the subset of columns, and determining whether the subset of columns are configured to have at least a minimum signal-to-noise ratio. For each subset of the n sets of columns, the method can also involve determining, on the basis of the measurement of the signal-to-noise ratio, whether the measurement of the signal-to-noise ratio is less than the minimum signal-to-noise ratio for the subset of columns. For each subset of the n sets of columns, the method can involve upon determining that the measurement of the signal-to-noise ratio is less than the minimum signal-to-noise ratio for the subset of columns, performing another scan of the subset of columns, obtaining another measurement of the signal-to-noise ratio related to the other scan of the subset of columns, and averaging the measurement and the other measurement of the subset of columns to produce a combined measurement that has a property where a signal-to-noise ratio related to the combined measurement is higher than the signal-to-noise ratio related to either of the measurements of the subset of columns.

In general, another aspect of the subject matter described in this specification can be embodied in methods that include the actions related to a data processing apparatus associated with a capacitive touch sensor, the sensor being located in a system comprising a liquid crystal display. The method includes determining a noise frequency in the capacitive touch sensor, identifying that the noise frequency is a function of a frequency of the liquid crystal display, and determining an excitation frequency for the sensor as a function of the determined noise frequency. The method of determining the excitation frequency includes selecting an initial excitation frequency for the sensor, computing a cross-correlation between the noise frequency and the initial excitation frequency over an integration period, where the computation of the cross-correlation is presentable in a sinc-like waveform with at least one peak and at least two nulls, and selecting the excitation frequency for the sensor by selecting a frequency at one of the nulls in the sinc-like waveform and assigning the determined excitation frequency to be a same frequency as the frequency at the selected null.

These and other embodiments can each optionally include one or more of the following features. The noise frequency can be within a range of about 30 kHz to about 135 kHz. The capacitive touch sensor can have a maximum transmit voltage of about 200V. The capacitive touch sensor can be configured to provide a current to travel through a user that is on an order of about tens of microamps. The capacitive touch sensor can include a front end interface. The method can include demodulating a waveform at an output of the front end interface of the capacitive touch sensor. The waveform can involve the cross-correlation of the noise frequency against the initial excitation frequency. The method can involve measuring a level of noise in the sensor, and setting an initial threshold for detecting a touch from a user of the sensor based on the level of measured noise. The method can involve continuously measuring the level of noise in the sensor, and continuously adjusting a threshold for detecting the touch from the user of the sensor based on the level of continuously-measured noise. The method can involve determining orthogonal excitation waveforms for the sensor, wherein at least one of the orthogonal excitation waveforms includes the selected excitation frequency. The sensor can be configured for simultaneous transmission of the plurality of orthogonal excitation waveforms. The orthogonal excitation waveforms can be all orthogonal to the determined noise frequency.

In general, another aspect of the subject matter described in this specification can be embodied in methods that include the actions related to a data processing apparatus associated with a capacitive touch sensor comprising rows and columns of trace lines arranged in a matrix configuration, the sensor being located in a system comprising a liquid crystal display. The method includes identifying a noise frequency, generating an excitation waveform to transmit across at least one of the trace lines in the sensor, where the excitation waveform is generated such that the excitation waveform is orthogonal to the identified noise frequency, and where the excitation waveform is generated such that noise at the identified noise frequency is rejected in the excitation waveform. The generation of the excitation waveform includes, in a frequency domain, specifying an initial excitation waveform, and converting the initial excitation waveform from the frequency domain into the excitation waveform in a time domain by using a Fourier transform in the conversion. The method involves transmitting the excitation waveform across at least one of the trace lines.

In general, another aspect of the subject matter described in this specification can be embodied in methods that include the actions related to a data processing apparatus associated with a capacitive touch sensor having rows and columns of trace lines arranged in a matrix configuration, the sensor being located in a system comprising a liquid crystal display. The method includes identifying a noise frequency, and generating an excitation waveform to transmit across at least one of the trace lines in the sensor, where the excitation waveform is generated such that the excitation waveform is orthogonal to the identified noise frequency, and where the excitation waveform is generated such that noise at the identified noise frequency is rejected in the excitation waveform. The generation of the excitation waveform involves selecting an initial excitation waveform, selecting an algorithm corresponding to a finite impulse response filter, and generating the excitation waveform by applying the algorithm corresponding to the finite impulse response filter to the initial excitation waveform. The method involves transmitting the excitation waveform across at least one of the trace lines. A measurement can be taken of a received signal strength, as correlated against an expected waveform, which can be proportional to the capacitance in the matrix. The signal-to-noise ratio of that measurement can be a function of the integration time, where the longer integration times can be used to achieve higher signal-to-noise ratios. The excitation waveforms can be orthogonal to each other and transmitted simultaneously, and in other implementations, the excitation waveforms can be orthogonal to each other, as well as to noise, and transmitted simultaneously.

The details of one or more embodiments of the subject matter described in this specification are set forth in the accompanying drawings and the description below. Other features and aspects of the subject matter will become apparent from the description, the drawings, and the claims.

BRIEF DESCRIPTION OF THE DRAWINGS

FIG. 14A depicts a diagram of an example of a two-stage front-end amplifier circuit.

Like reference numbers and designations in the various drawings indicate like elements.

DETAILED DESCRIPTION

A touch sensor can include an array of transparent, conductive electrodes, where a capacitance measurement can be made between electrodes in the touch sensor. These electrodes may be made from indium tin oxide (ITO), but other materials may also be used, such as silver nano-wires, or larger-scale metal wires that are slightly or largely opaque but small enough to be relatively inconspicuous. The electrodes may be arranged in a two-dimensional orthogonal grid, for example, with rows parallel to an x-axis, and columns parallel to a y-axis. The total capacitance resulting from this structure, as measured from a row to a column, can include at least a parallel plate capacitance, for where a row may cross over a column, and a fringing capacitance, for which a fringing field can go outward from the sensor and interact with a user's touch, for example. The primary capacitance that can be measured for sensing can include a fringing field at least between the row and the column. For instance, in a system with m rows and n columns, there can be m*n possible measurements, with one measurement at each intersection in the matrix. This type of measurement may be sometimes referred to as "mutual capacitance," or "differential capacitance."

The electrodes in the sensor may be designed in a pattern that seeks to maximize the fringing capacitance, which can be interrupted by the user's finger to provide the desired or target signal, and to minimize any additional capacitance between the row and column (e.g., parallel plate capacitance), which may provide a constant offset. The parallel plate capacitance may be considered, for example, as an offset value in the total capacitance. The rows and columns in the matrix can be nearly coplanar, so that while an area of a respective parallel plate capacitor is small, the separation distance is also small, and its capacitance value may be significant. The pattern of electrodes may also be designed in a manner to make the line width as great as possible, for a given pitch, in order to minimize the resistance of the traces, which may be otherwise significant if large-area sensors are employed. The fringing capacitance can be maximized, for example, by designing the pattern so that the resulting fringing capacitance can be made as large as possible.

Figure 1:
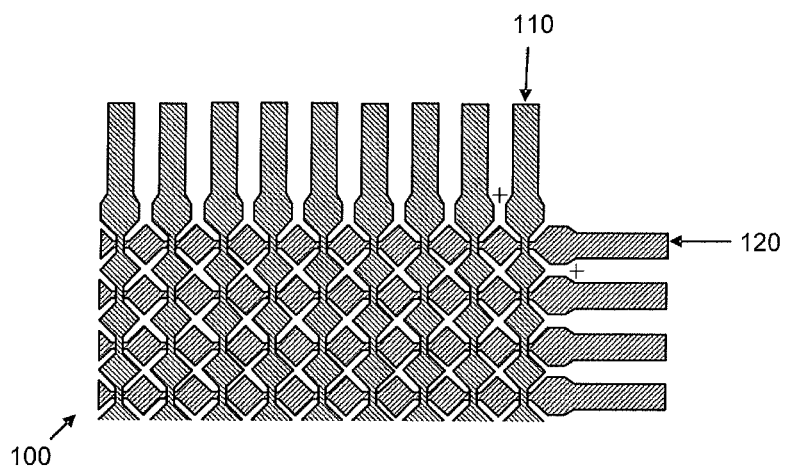
FIG. 1 depicts a diagram of an example of an electrode pattern in a matrix for a touch sensor.

FIG. 1 depicts a diagram of an example of an electrode pattern 100 in a matrix for a touch sensor. In this pattern 100, the vertical traces 110 and associated connected areas denote a conductor on one layer, and the horizontal traces 120 and associated connected areas denote a conductor on another layer. The layers 110, 120 are separate from each other. In this implementation, the layers 110, 120 cross over each other, but do not connect to each other. The structure is subject to parallel-plate capacitance, where the undesired parallel-plate capacitance can be minimized by making the electrode traces narrow where they cross over each other, the resistance can be reduced and minimized by making the electrode traces relatively wide in other areas.

Other implementations may have other electrode patterns. In one implementation, for example, one pattern may involve having evenly-spaced straight lines at the same pitch as the electrical matrix, straight lines at a finger pitch in the electrical matrix, with adjacent lines connected together in groups, and interdigitated patterns to increase a perimeter between a given row and column in order to increase the fringing field.

There may be other measurements performed on the electrode patterns. For example, capacitance can be measured from each row and column to ground, instead of from each row to each column, thus making m+n measurements instead of m*n measurements.

Implementations are described in this disclosure where the measurement of capacitance is from each row to each column. There may be a circuit designed to perform this type of measurement, the circuit having transmitters and receivers on respective columns and rows. In an implementation of this circuit, the columns can be excited with a transmit voltage so that energy flows from the transmitter into the columns, and a receiver can measure the current on the rows so that the energy flows out of the rows and into the receiver. While the designation of one axis as the rows and another as the columns is generally arbitrary, in this implementation the rows generally may be attached to receivers and the columns generally may be attached to the transmitters.

When the user touches the capacitive touch sensor, at least two different effects are observed. First, some of the energy flowing out of the transmitter can flow into the user and return to ground through the user's stray capacitance to that node. This stray capacitance may occur, for example, if the user is holding the device's metal case, even through a non-conductive coating, or, failing that, through the user's finger, because the sensor pitch can be fine enough so that their finger can also be close to other elements in the matrix, for which some elements will be grounded. This first effect may decrease the total energy that flows to the receiver. Second, some of the energy flowing out of the transmitter can couple into the user's finger, through the user's flesh, and then out of the user's finger to the receiver. Because the dielectric constant of the user's finger, which is approximately the same as salt water, is larger than that of air, this can increase the coupling effect, and increase the received energy.

The two effects can produce different responses for the energy flow. For example, depending on which effect dominates, there may be a non-monotonic relationship between the measured signal and the distance from the user's finger to the sensor. Because this may be undesirable, system implementations can be designed to operate in either a strictly-increasing or a strictly-decreasing mode to have a monotonic relationship. The strictly-decreasing mode may be preferable in some implementations because it may occur at higher frequencies, which can allow more total charge transferred in a given integration period for a higher SNR, and the strictly-decreasing mode may provide larger separations between the sensor and the user's finger, which can allow a larger thickness for the glass for the cover of the sensor. Some other implementations, however, may use the strictly-increasing mode.

In some implementations, the transmit waveform can have a frequency of around 100 kHz, for example. If the energy of the transmit waveform is concentrated mostly at lower frequencies, then the energy may not couple effectively to the user because the coupling is capacitive, such that current, for a given excitation voltage, can increase with the frequency. If the energy is concentrated mostly at higher frequencies, then the propagation characteristics of the row or column within the sensor can attenuate the energy. In some implementations, the propagation characteristics may be modeled as a uniform RC line, or a low pass filter. The transmit waveform may include, for example, a small number of cycles of an unmodulated carrier. Because this waveform can be narrow band, it can be useful to increase the bandwidth of the signal slightly, for example, by modulating the carrier with a noise-like waveform. This technique may have the effect of increasing the system's immunity to narrowband noise, and decreasing the tendency of the system to emit narrowband noise.

The receiver can be configured to measure an amount of energy received during a given time interval. One implementation for this receiver involves an implementation as a "peak detector," which refers to a broadband receiver circuit that can measure a maximum current received over a given period of time. If the only signal present is the signal from the transmitter, then that maximum current can be proportional to the amplitude of the signal received from the transmitter. Other implementations of the receiver may be configured to measure the current while discriminating the intended signal from noise.

In some implementations of the sensor, the performance of the system may be practically limited by its SNR. For example, when the touch position on the sensor is interpolated, noise on the measured capacitance can map directly to noise on the reported (x, y) position. In some extreme cases, for example, the noise itself may even contribute to create false touches. There may be several sources of noise for the sensor. For example, one significant source can be a liquid crystal display (LCD). For example, if a touch sensor is built on top of the touch screen, noise from the LCD may be present and may couple into the touch sensor. Other significant noise sources may include nearby radio stations (e.g., amplitude modulation (AM) radio), and 50 or 60 Hz coupling from the electrical mains which, while well-separated in frequency from the desired or target signal, may have very large amplitude.

In other receiver implementations, the receiver architecture can be configured to look only for the component of the received signal that correlates with the transmitted signal. For these receiver implementations, for an incoming current r(t), and an expected current e(t), the receiver can compute the integral over an integration period of r(t)*e(t).

In some implementations, it may be possible to approximate this correlation by placing a linear filter in front of the peak detector, or in front of some other broadband detector. In some of these implementations, a narrower filter may require a longer settling time, which can impact the system's frame rate. The correlation over a fixed interval may also require a longer time to achieve a narrower bandwidth. But with a filter, generally some fraction of the available integration time is unused while waiting for the filter to settle after the previous measurement, while in a correlation over a fixed interval, the integrator can be reset between measurements. This can allow the full use of the available integration time.

The calculation of the integral can have various implementations. For example, some implementations can include a sigma-delta analog-to-digital converter (SD-ADC), whose control loop may attempt to maintain the row at constant voltage and may inject a sufficient charge to do so. By measuring that charge, the SD-ADC can directly convert the current to a digital value, and can maintain the row at low impedance, as may be required. The SD-ADC implementation can be amenable to integration on typical CMOS processes because the SD-ADC uses switches, capacitors and digital logic.

Other implementations for calculating the integration period may use simpler switched capacitor circuits. For example, one such switched capacitor circuit may be made by effectively building an RC low-pass filter, in which C the capacitance of a real capacitor, and R is the resistance of the switched-capacitor resistor with a value of 1/(f*Cut), where Cut is the capacitor under test, and f is the switching frequency. By measuring the time constant of that filter—for example, by applying a step to it, and measuring the time for it to reach a certain voltage threshold, or by applying a step, letting it settle for a fixed time, and measuring the voltage after that time—it can be possible to measure Cut. Other similar implementations of switched-capacitor circuits, in which a constant current discharges the integrating capacitor while the switched capacitor current charges it, involves a control loop that maintains the integrating capacitor at constant voltage.

Descriptions herein are provided for implementations and (1) techniques involving a capacitive touch sensor that uses digital signal processing to correlate a transmitted waveform with a signal at a receiver in the sensor; (2) techniques for a capacitive touch sensing matrix that has transmitters and receivers, where the transmitters send out orthogonal waveforms, and each receiver correlates against each transmitted waveform separately; (3) techniques for locally improving the signal to noise ratio in a capacitive touch sensor by selective scanning; (4) techniques for providing noise immunity in the transmitted waveform for the capacitive touch sensor; and (5) techniques for designing analog front-end circuits for the capacitive touch sensing system.

Correlation within the Receiver

Several techniques and implementations are described herein involving a capacitive touch sensor that uses digital signal processing to correlate a transmitted waveform with a signal at a receiver in the sensor. In one implementation, for example, an output voltage VD0 from the analog front-end circuit of the sensor system can be sampled using an analog-to-digital converter (ADC). The correlation of that discrete-time signal against the transmitted waveform can then computed digitally, as the sum over the integration period of VD0[k]*E[k], where E[k] is the expected received signal. This sum can be calculated, for example, by using a field programmable gate array (FPGA), by choosing E[k] as 0, −1, or +1, where the correlation may be calculated by an adder and/or a subtractor. This implementation can introduce relatively little error, and can allow for an efficient implementation in digital logic.

The expected signal E[k] can be determined in order to perform the correlation. In some implementations, the received signal could be roughly the same as the transmitted signal so that this received signal could be used to correlate against the same signal that is being transmitted. In practice, these implementations may not produce an accurate E[k] at least because of the characteristics of the sensor matrix, which can cause delay, attenuation and/or phase shifts. For example, the sensor matrix can be made from long rows and columns, which can be patterned from a transparent conductive material. These materials may have a relatively large electrical resistance. For instance, trace lines made from indium tin oxide (ITO) can have an acceptable maximum thickness corresponding to a sheet resistance of around 50 ohms/square. A unit cell, for example, can be three or four squares, and a typical pattern pitch can be, for example, around 5 mm. A 500 mm trace, as would be typically used in a 1000 mm display, for example, may have around 100 cells, or 400 squares, or ~20 k ohms in resistance. A thicker coating of ITO could decrease that resistance, as well as increasing optical loss and haze. At 30 ohms per square, a typical coating of ITO may not be acceptable cosmetically for some implementations Thinner coatings, with a sheet resistance in the hundreds of ohms per square, for example, can be used in smaller screens, such as those on cell phones and other portable devices, for where the lines in such screens are much shorter, so the total resistance is not as large.

The sensor also can have some capacitance, at least from each row to each column, and from each row or column to a ground plane (e.g., the AC-grounded metal of the LCD). In one approach to estimate values, a cell might have an area around 5*5/2~10 mm^2, for example, and if separated by 0.5 mm from a ground plane by a material with dielectric constant around 3, then it may have a total capacitance around 1 pF. The parallel plate capacitance C=epsilon*A/d can be somewhat less than that amount, but the fringing fields can have a significant capacitance contribution. The product tau=RC can be around 2 us, corresponding to a −3 dB frequency of 80 kHz, when assuming each of these resistances and capacitances as lumped elements.

In practice, both the resistance and the capacitance tend to be distributed, and may be roughly uniformly distributed, along the trace line. For example, the capacitance (or resistance) can be non-uniform over the cell, but relatively constant per cell, and the cells can be small compared to the total length of the line, so that the capacitance can be roughly uniform over the total length of the line. Accordingly, in another approach to estimate values, the circuit for the sensor can be analyzed as a transmission line, with negligible inductance L and shunt conductance G, and the given R and C. Regardless of the approach taken to the analysis, the signal on the line tends to be attenuated (i.e., smaller amplitude) and delayed (or, equivalently, phase-shifted) compared to the transmitted signal. Implementations are described where the receiver can be configured to compensate for these effects.

In some implementations, compensation can be performed by applying the expected phase shift (or delay) to the expected waveform E[k], and correlating against the delayed version of the signal. The correct delay may be different for every intersection in the matrix, though the error introduced by adjusting the phase only along the sensor's longer dimension, and neglecting effects of the shorter dimension (e.g., adjusting it only along the rows, for a typical 16:9 display in landscape format) may be negligible. A correct phase shift may be determined experimentally, for example, by measuring the correlation with multiple phase shifts, and choosing the phase shift that increases and maximizes this correlation. The correct phase shift may also be determined experimentally by correlating against both in-phase and quadrature (e.g., shifted ninety degrees) versions of the transmitted signal, and then computing the correct phase shift phi=a tan (corr_q, corr_i) from those correlations. In some implementations, the expected phase shift may be calculated using the known resistance and capacitance of the sensor, or the phase shift may be interpolated between a small number of experimentally-measured phase shifts.

Figure 2:
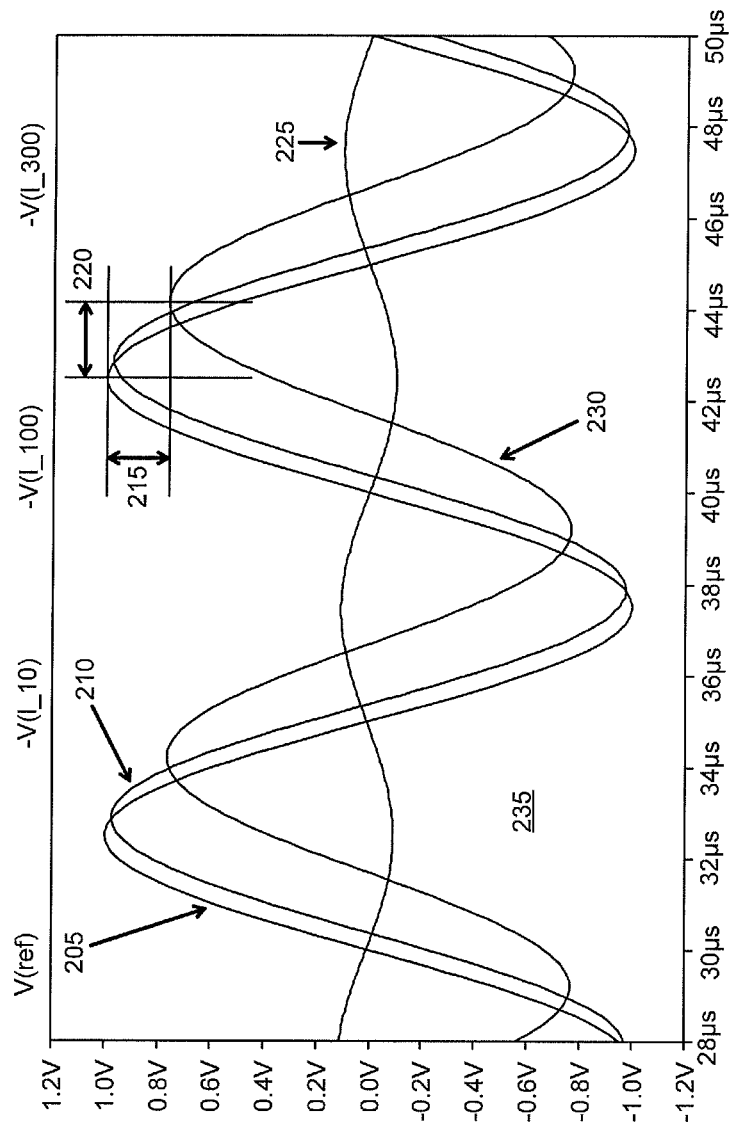
FIG. 2 depicts a diagram of an example relating to some effects of attenuation and phase shift from resistor-capacitor (RC) line filtering in the touch sensing system.

FIG. 2 depicts a diagram of an example relating to the effects of attenuation and phase shift from resistor-capacitor (RC) line filtering. The diagram shows plots of several signals based upon a voltage level over time, where the diagram is based upon a model 235 where one cell adds 2 pF shunt capacitance, and 150 ohms series resistance (which could be typical, for example, if the sensor uses a 50 ohm/sq ITO coating), and a 100 kHz excitation. As shown in FIG. 2, when the original transmitted signal 205 is sent across the sensor for a line length of 10 cells, the received signal 210 is delayed/phase shifted and has a smaller amplitude than the original transmitted signal 205. When the original transmitted signal 205 is sent across the sensor over a line length of 100 cells, the received signal 230 is delayed/phase shifted 220 and has a larger attenuation 215 and smaller amplitude than the original transmitted signal 205 and the received signal 210. When the original transmitted signal 205 is sent across the sensor over a line length of 300 cells, the received signal 225 is delayed/phase shifted and has a smaller amplitude than the original transmitted signal 205, the received signal 210 and the received signal 230.

If the transmit waveform includes energy at a single frequency, then the effect of the RC line may be described as an attenuation and a phase shift. If the waveform is more complex—for example, if a noise-like code is used to increase the bandwidth of the signal, and improve the system's electromagnetic compatibility (EMC)—then the different frequency components of the signal can be transformed differently, and the transformation applied to the signal can be more complex. This transformation can be modeled, or measured empirically, and applied to the expected waveform as well. For example, the transformation can be modeled to have a phase shift (e.g., delay) and attenuation at a particular frequency, a linear filtering effect, or any combination thereof. The transformation can be applied to a sinusoidal waveform for the expected correlation signal or a non-sinusoidal waveform for the expected correlation signal. The correlation signal may be in the analog domain or in the digital domain.

In some implementations, the system may be sensitive to the delay along the RC lines only because it performs phase-coherent demodulation in its receiver. A non-coherent receiver (e.g., a peak detector, or a system that computed correlations against both in-phase and quadrature versions of the signal and returned sqrt(corr_q^2+corr_i^2), or some approximation to that function) may not have a requirement for this correction. But coherent demodulation can be used to decrease the received noise power by a factor of two, assuming that the noise comes with random phase. Coherent demodulation can help to improve the SNR.

In some implementations, if the sensor is driven from only two edges (e.g., one edge for the rows, and one edge for the columns), then the R*C product can be determined by the resistance and capacitance per unit length of the lines, and the actual lengths of the lines, where the worst case can be the end of each trace farthest from the contacts for which the total resistance and total capacitance can be defined as R and C, respectively. In other implementations, the sensor can be driven from all four edges, for which the RC time constant can be reduced from the case where the sensor is driven from only two edges. A worst-case total resistance for these implementations, for example, can occur at the center of the line, not at either edge. That point can be driven by two lines of half the total length, or two resistors of value R/2 in parallel, or (R/2)/2=R/4. The capacitance may be unchanged for these implementations. So by driving the lines from both ends, instead of just one end, the time constant can be reduced by a factor of four, and there can be an increase for the cutoff frequency of the line by the factor of four.

In one implementation, this configuration for generating the factor of four can be achieved by connecting the two ends of the trace with a conductive (e.g., copper) wire, and routing that trace all the way around the sensor.

Figure 3:
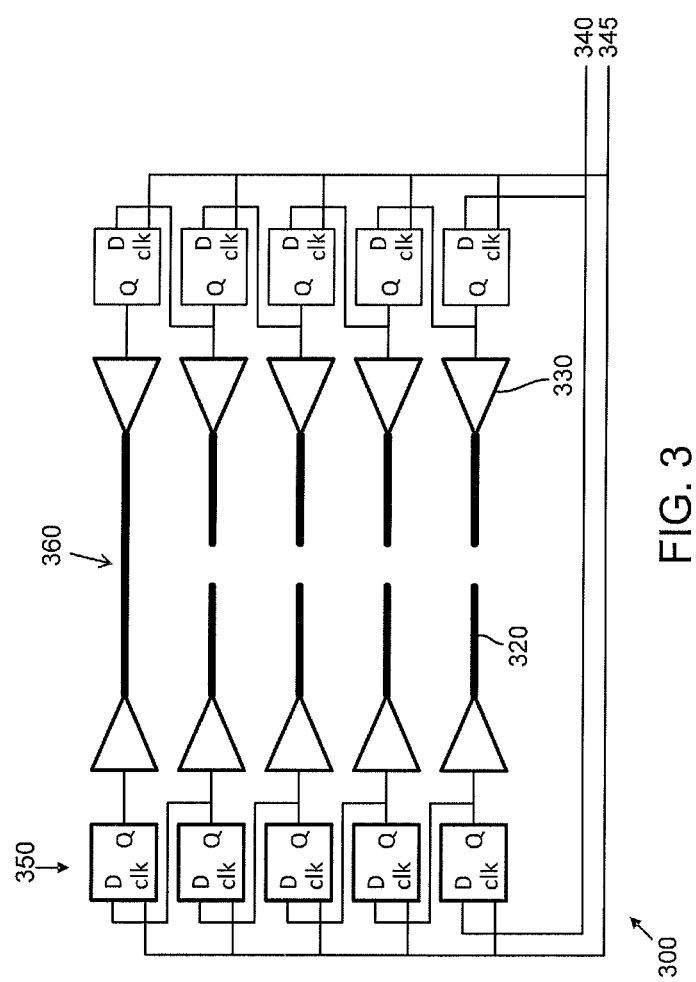
FIG. 3 depicts a diagram of an example of a circuit including transmitters having corresponding control logic to drive voltages across lines of the matrix.

FIG. 3 depicts a diagram of an example of a circuit 300 including transmitters having corresponding control logic to drive voltages across lines of the matrix. The circuit 300 includes identical copies of the same circuit on either end of the lines 320, and control logic to drive them with identical waveforms. D flip flops are arranged into shift registers, such as shift register 350. The circuit includes transmitters each having a long, high-voltage shift register, with one output per column, and a high voltage (HV) driver 330 to drive the respective ITO line 320. A separate shift register 350 connects to each side of the matrix, and the two shift register chains are provided with the same logic inputs 340, 345, so that their outputs follow in lock step.

In FIG. 3, the circuit is symmetrical, and the trace lines can optionally be split 360 in the middle. With the symmetry, the circuits on either side are identical, and the voltages on either side of the split can be equal, and the current may not flow across that point, regardless of whether or not it is split. An error in the drive circuit, for example, could result in current flow if the traces were left connected, and the two ends were driven to opposite voltages. But this error in the drive circuit may be unlikely to happen, and the resistance of the trace line can be large enough so that the current can be limited to a safe value in any case. If the trace lines were split, and an open-circuit defect occurred somewhere along the trace, then a portion of that trace line would be dead. If the trace line was left connected, then even with a single open-circuit defect, the full length of the trace line would remain connected, though one of the lines could be much longer than the other (and longer than half the total length), depending where the defect occurred. In practice, the decision of whether to split the lines or not can be arbitrary for this type of symmetrical implementation.

Implementations can also be employed to correlate against a different waveform (e.g., a different phase) for each intersection, according to the expected delay down the RC lines. Some implementations can correlate with respect to multiple waveforms simultaneously.

Figure 4:
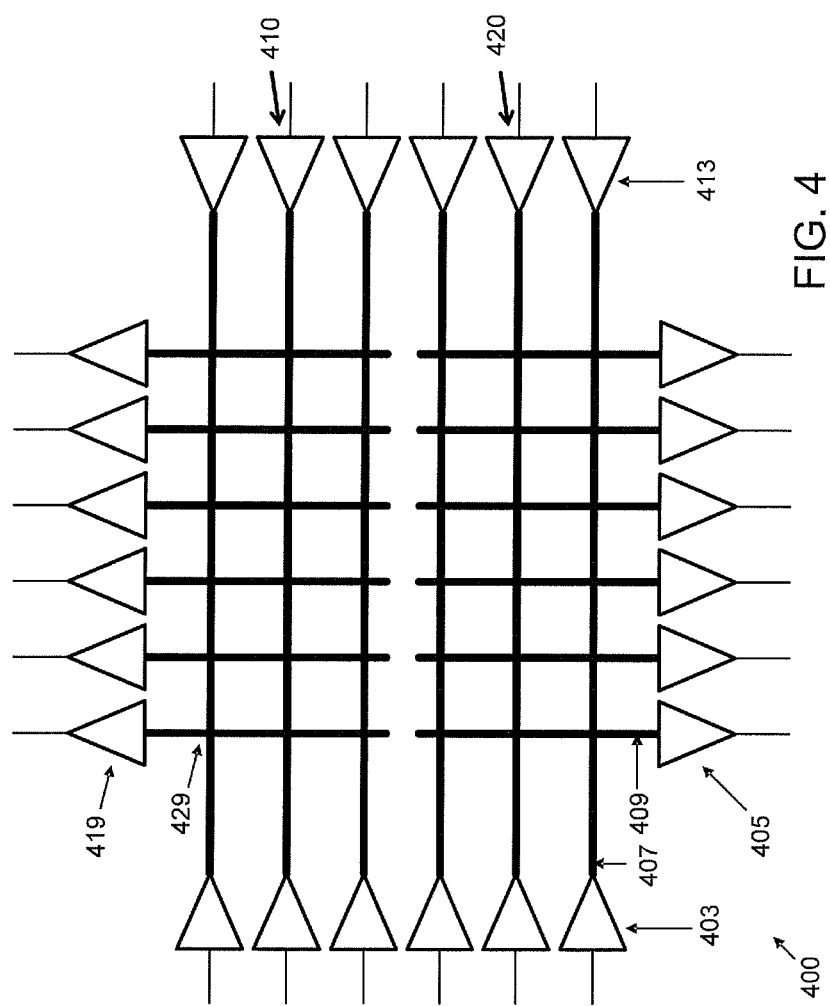
FIG. 4 depicts a diagram of an example of a circuit including transmitters and receivers to drive voltages and sense currents across lines of the matrix.

FIG. 4 depicts a diagram of an example of a circuit including transmitters and receivers to drive voltages and sense currents across lines of the matrix. FIG. 4 shows a symmetrical design for a circuit 400 in both the column and row directions. The circuit 400 has at least one transmitter 403 on each row 407 and at least one receiver 405 on each column 409. Specifically, the circuit 400 has two transmitters 403, 413 on each row 407 and at least one receiver 405 or 419 on each line 409 or 429. In the upper half of the circuit 400, the current from transmitter 410 can be received only by the upper receivers. In the lower half of the circuit 400, the current from transmitter 420 can be received only by the lower transistors.

On the receiver's side, the trace line is split at the middle, and the output of each half's receiver can be processed separately. This implementation allows two transmitters to be excited simultaneously, as long as their columns are on opposite sides of the split, since they will be handled by different sets of receivers. As a result, all the columns can be scanned at twice the speed, except for those very close to the split. This implementation can also double the frame rate, given the same integration time, or can double the integration time given the same frame rate.

Figure 5:
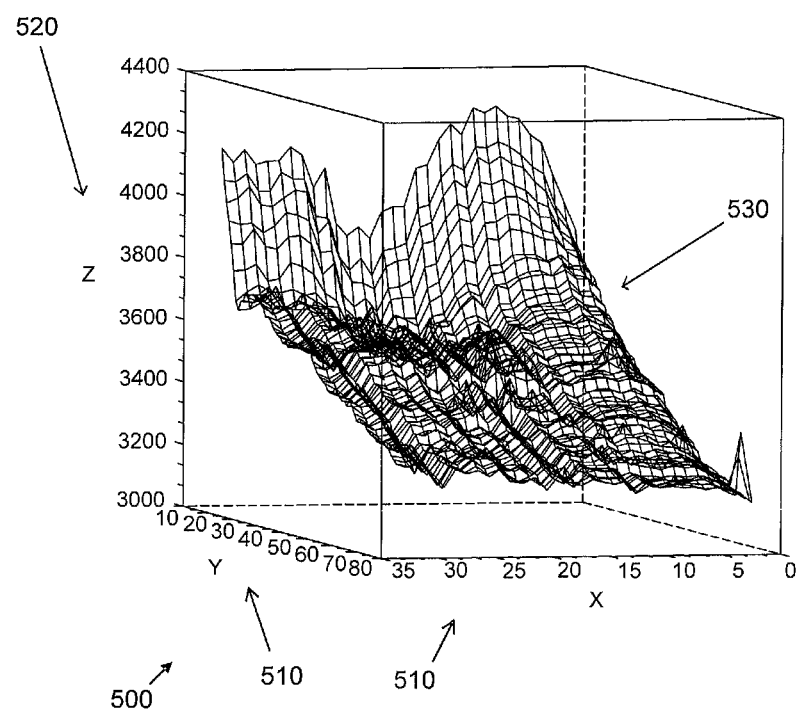
FIG. 5 depicts a diagram of an example of a three-dimensional mesh plot of measured capacitance with respect to location across the matrix.

FIG. 5 depicts a diagram of an example of a three-dimensional (3D) mesh plot 500 of measured capacitance 520 with respect to locations 510 across the matrix along the surface of the touch sensor. In the 3D mesh plot 500, the z-axis represents the measured baseline capacitance, and the x-axis and y-axis represent positions in the matrix along the surface of the touch sensor. When the received signal strength is correlated for every intersection in the plot 500, the received signal strength falls off along the long lines of the matrix. The plot 500 shows, for instance, that there is an exponential fall off in the received signal strength 530 versus the position due to the attenuation of the RC trace lines. The plot 500 includes variations in the measured capacitance, which may be due to noise or to some other mechanical variation in the assembly.

Code-Divided (Vs. Time-Divided) Transmit Waveforms

Techniques and implementations are described for a capacitive touch sensing matrix that has transmitters and receivers, where the transmitters can send out orthogonal waveforms, and each receiver can correlate against each transmitted waveform separately.

In some implementations, a measurement is taken of a received signal strength, as correlated against an expected waveform, which is proportional to the capacitance in the matrix. The signal-to-noise ratio of that measurement can be a function of the integration time, where the longer integration times can be used to achieve higher signal-to-noise ratios. In some implementations, the excitation waveforms can be orthogonal to each other and transmitted simultaneously, and in other implementations, the excitation waveforms can be orthogonal to each other, as well as to noise, and transmitted simultaneously.

In some implementations, a way to improve the signal to noise ratio in the capacitive touch sensor is to increase the integration time. The received signal energy can increase linearly with that time, while the energy received due to random noise increases only as the square root. Because the frame rate of the system also scales with the integration time, this can be a tradeoff between frame rate and SNR. Other implementations can be made that can activate multiple transmitters simultaneously, using code division instead of time division.

Figure 6A:
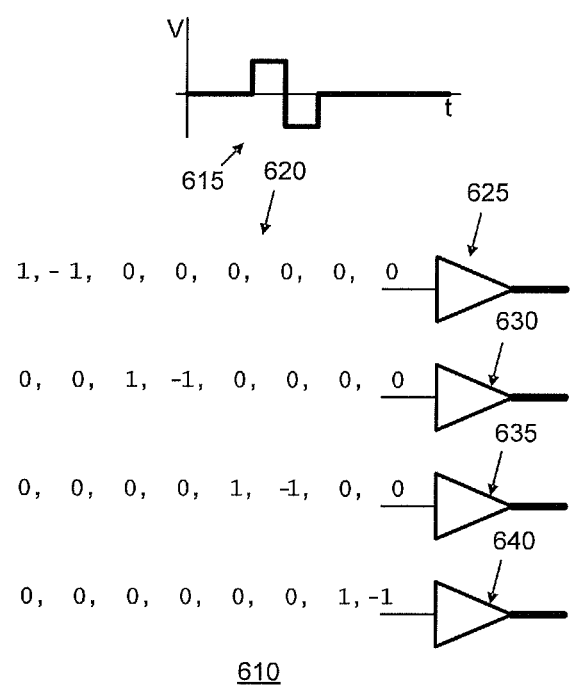
FIGS. 6A and 6B depict diagrams of examples of waveforms for transmitters, when exciting the matrix with a voltage that is noise-like and not a pure sinusoidal tone or a close approximation thereto.
Figure 6B:
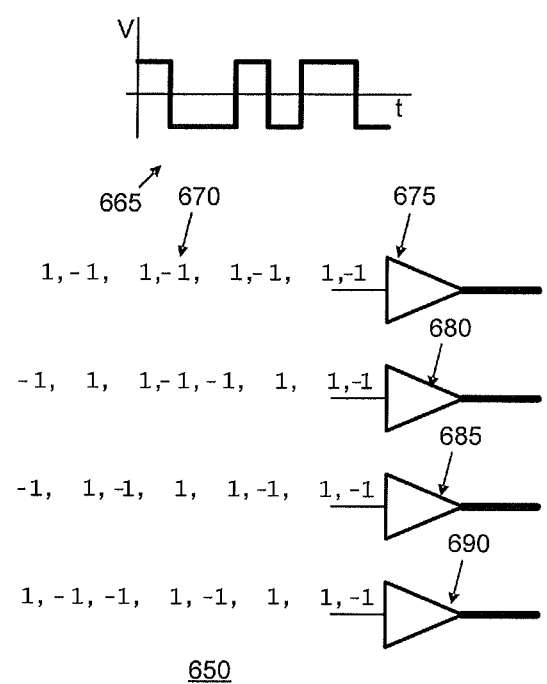

FIGS. 6A and 6B depict diagrams of examples of waveforms for transmitters. FIG. 6A has waveforms with excitation involving time-division multiplexing, and FIG. 6B has waveforms with excitation involving code division multiplexing. For instance, FIG. 6A shows transmitters 625, 630, 635, 640 where the transmitters have waveforms 620 that are time divided with respect to one another (e.g., time division multiplexing). For example, transmitter 630 has a waveform sequence [0, 0, 1, −1, 0, 0, 0, 0], where the voltage versus time plot 615 shows that the digital value 1 represents a voltage above 0V, the digital value −1 has a voltage below 0V, and the digital value 0 represents 0V. Transmitter 625 has a waveform sequence [1 −1, 0, 0, 0, 0, 0, 0], transmitter 635 has a waveform sequence [0, 0, 0, 0, 1, −1, 0, 0], and transmitter 640 has a waveform sequence [0, 0, 0, 0, 0, 0, 1, −1]. For this implementation, at any time, only one of these waveforms is non-zero so that they are orthogonal.

FIG. 6B shows transmitters 675, 680, 685, 690 where the transmitters have waveforms 670 that are orthogonal with respect to one another, but where at any given time, multiple transmitters may be transmitting a non-zero voltage (e.g., code division multiplexing). For example, transmitter 690 has a waveform sequence of [1, −1, −1, 1, −1, 1, 1, −1], where the voltage versus time plot 665 shows that the digital value 1 represents a voltage above 0V, the digital value −1 has a voltage below 0V, and the digital value 0 represents 0V. Transmitter 675 has a waveform sequence [1, −1, 1, −1, 1, −1, 1, −1], transmitter 680 has a waveform sequence [−1, 1, 1, −1, −1, 1, 1, −1], and transmitter 685 has a waveform sequence [−1, 1, −1, 1, 1, −1, 1, −1]. Even though a Manchester-coded Hadamard sequence is shown in FIG. 6B, the sequence is not limited to this type of sequence. In general, any orthogonal sequence may be used. In some implementations, for example, the orthogonal sequence could be used to modulate more than just a single cycle of carrier in order to narrow the bandwidth of the signal.

In implementations similar to FIG. 6B, transmitters send out orthogonal waveforms, and each receiver, instead of performing just one correlation, correlates against each transmitted waveform separately. The orthogonal waveforms generally may be generated in any number of implementations. For example, (almost) orthogonal noise-like codes may be generated by taking successive cyclic shifts of a maximum-length shift register sequence. Some implementations may involve classes of codes that may be used in code division multiple access (CDMA), or orthogonal pure tones (e.g., unmodulated carriers at a single constant frequency) may be generated and demodulated efficiently with a Fast Fourier Transform (FFT), as in orthogonal frequency-division multiplexing (OFDM).

One of the main reasons to transmit on multiple columns simultaneously is to increase the total transmitted energy, and thus improve the SNR by increasing the signal level, while the noise remains unchanged. Another, although somewhat less important, reason is to utilize a broadband code word, which may be used in the presence of narrowband additive noise.

While these codes are orthogonal over the full period (i.e., the integral from 0 to T of code_1(t)*code_2(t)=0), they are not necessarily orthogonal over shorter periods (i.e., that integral for some shorter time is not necessarily zero). This can mean that a very brief touch, or motion of the user's finger during the integration period, can cause spurious correlations against other codes, effectively raising the system's noise floor. This effect can become more significant as the integration time increases, and as the number of simultaneous codes increases. This can practically limit the integration time, which can limit the acceptable number of simultaneous codes.

Implementations of the described transmission technique can therefore be applied partially. In some implementations, the transmission can occur on a small number of columns simultaneously, instead of transmitting on only one column at a time (e.g., a traditional time-division-only system), or on all of the columns simultaneously (e.g., a naïve CDMA system). For example, if there are 90 columns in the matrix, then those columns can be driven in pairs, and the frames can be divided into 45 integration times. In another example, the columns can be driven in triples (e.g., three at a time), and the frame can be divided into 30 integration times. By transmitting on only a smaller number of columns simultaneously, the integration period is kept short enough that the user's finger is roughly stationary over that period, and the spurious correlation does not occur.

The time-divided waveforms for this technique can be orthogonal over any interval, for example, and not just for the full period of the waveforms. This can mean that motion of the user's finger during the measurement can behave as expected by just weighting each received waveform according to the amount of time that the user's finger was at or around a corresponding location of the sensor.

Some implementations for determining the orthogonal excitation waveforms can involve selecting a first frequency for modulation, generating a pseudo-noise sequence around the first frequency, generating a carrier signal for the pseudo-noise sequence, and modulating a number of cycles of the carrier signal around the first frequency with the pseudo-noise sequence. The first frequency can be generally around 100 kHz, and wherein the number of carrier signals is less than ten, for example. If electrical noise from a source outside the sensor is present at a narrow range of known frequencies (for example, the horizontal refresh frequency of an LCD, or the frequency of operation of a cold-cathode fluorescent backlight), then all of the excitation waveforms may be designed to be orthogonal to those noise frequencies. In some implementations, the generation of a waveform that is orthogonal to some noise frequency may depend on at least both the modulation frequency and the base pseudo-noise code.

In some implementations, if electrical noise from a source outside the sensor is present at a narrow range of frequencies, but the exact frequencies are unknown, then those frequencies may be measured, and the excitation waveforms may be chosen adaptively at run time to be orthogonal to the measured noise sources. The frequencies of the noise may be determined, for example, by holding most or all of the transmitters at constant output voltage, and measuring the spectrum of the signal that is incoming to the receivers. This measurement may be repeated, for example, at an interval corresponding to the rate at which the unknown frequency is expected to change, or run continuously, and averaged with a time constant corresponding to the rate at which the unknown frequency is expected to change.

Locally Improving Signal to Noise

Techniques and implementations are described for locally improving the signal to noise ratio in a capacitive touch sensor by selective scanning.

In some applications, it can be useful to know not just when the user is touching the sensor, but also when the user is about to touch the sensor (e.g., when the user is holding their finger within a few millimeters of the sensor, but not touching it). Having the ability to detect this condition is sometimes referred to as a "hover" condition.

Techniques are described to measure the "hover" using only the standard differential capacitance. For example, the techniques can involve measuring the "hover" by maintaining an appropriate frame rate for a target touch performance (e.g., around 120 Hz), and temporally averaging the output correlations to produce a lower-speed, lower-noise signal for the "hover" condition. Techniques can also involve spatially averaging, by convolving each frame's image with a kernel the size of the expected response. For example, when the user is touching the matrix, the user can produce a spot of about 10 mm in diameter, for example. As the user moves their finger away from the matrix, the intensity of that spot can decrease, but the spot's diameter can increase. So the decreased spatial resolution can be acceptable for this example.

There can be other techniques to improve the noise performance by selecting certain transmit elements for additional integration time. For example, there can be an initial scan of the matrix to determine that sensor elements at (3, 5) and (8, 2) are above a threshold condition for detecting the hover condition (e.g., a hover threshold), but the hover threshold may be very close to the noise floor, which may trigger a false actuation. To avoid triggering the false actuation, columns 5 and 2 can be scanned for an additional interval and those results can be averaged with the original data to improve the signal to noise for those candidates. If the improved measurement is still above the hover threshold, then the measurement can be reported, otherwise, the measurement can be rejected. The frame rate may not be significantly degraded as long as only a small fraction of the columns are touched or hovered at a given time. In some other implementations where there are fewer receivers than rows, the receivers can also be time-multiplexed by selecting row.

Other techniques can be used even just for touch, for example, for the condition that the screen size is too large for a complete scan to return data with an acceptable SNR and frame rate. It would be possible, for example, to scan the entire screen with a short integration time, and then re-scan only those columns in which touches may have been present, according to the initial scan. It would also be possible, for example, to scan those columns in which touches were present in the previous frame with long integration times, and scan the rest of the matrix with a shorter integration time, or even less than once per frame (e.g., in an interlace pattern). From these approaches, the initial touch can have a slightly increased latency, but a decreased latency on subsequent frames.

Figure 7A:
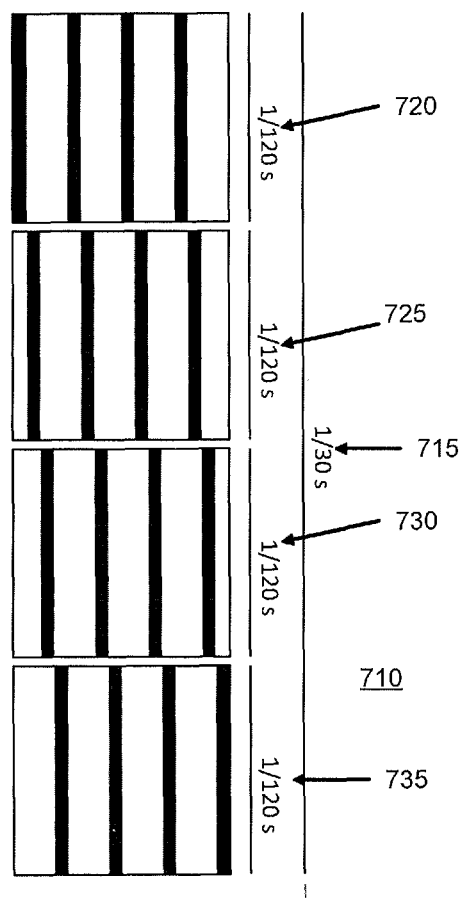
FIGS. 7A and 7B depict examples of timing diagrams for frames and subframes.
Figure 7B:
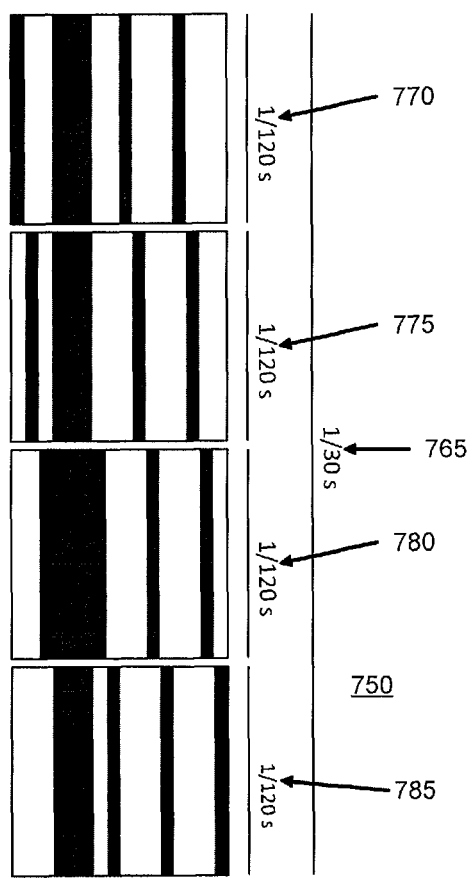

FIGS. 7A and 7B depict diagrams of examples of timing diagrams for frames and subframes. FIGS. 7A and 7B show techniques to locally improve SNR by selective scanning, including performing a scan of the whole sensor in an interlace pattern (e.g., 1:4 interlace, with full frames at about 30 Hz and subframes at about 120 Hz) while scanning those columns that had touches last frame at full speed (for the latency of a 120 Hz system, once the user has touched it).

FIG. 7A shows a diagram of an example of a scan at a scan frequency of 30 Hz for a frame 715 with four subframes 720, 725, 730, 735 having a subframe frequency of 120 Hz. FIG. 7A shows that there are 16 columns per frame with four columns per subframe and four subframes per frame. The scan in FIG. 7A shows an interlace pattern with no touches.

FIG. 7B shows a diagram of an example of a scan at the scan frequency of 30 Hz for a frame 765 with four subframes 770, 775, 780, 785 having a subframe frequency of 120 Hz. FIG. 7B shows that there are 16 columns per frame with four columns per subframe and four subframes per frame. The scan in FIG. 7B shows an interlace pattern with a touch in column 4, where columns 3, 4 and 5 are always scanned for enhancing latency. In some implementations, the latency of the system may be around 120 Hz once the user has touched it.

Figure 8A:
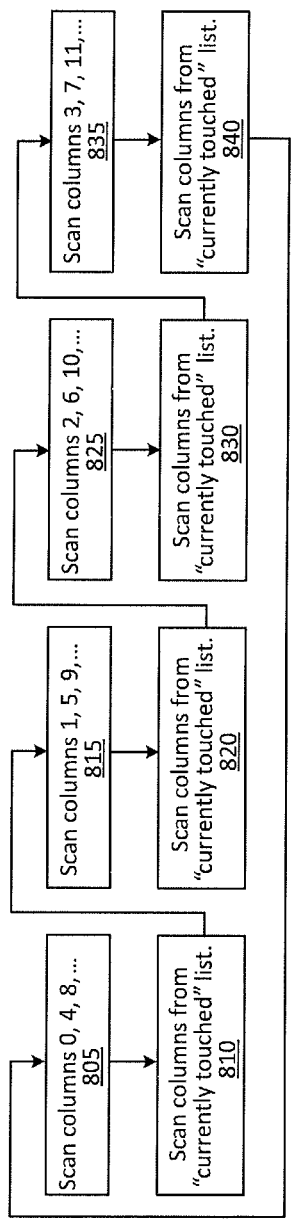
FIG. 8A depicts a flow diagram of an example of a method to scan a full frame of the sensor.

FIG. 8A depicts a flow diagram of an example of a method 810 to scan a full frame of the sensor. FIG. 8A shows the method 810 as interlaced 4:1, where a first set of selective columns are scanned and columns are scanned from a currently touched list, and a second set of selective columns are scanned and other columns are scanned from a currently touched list. The method involves scanning columns 0, 4, 8, . . . (805), and scanning columns from the "currently touched" list (810). Then, columns 1, 5, 9, . . . (815) are scanned, columns from the "currently touched" list (820) are scanned, then columns 2, 6, 10, . . . (825) are scanned, columns from the "currently touched" list (830) are scanned, and then columns 3, 6, 11, . . . (835) are scanned, and columns from the "currently touched" list (840) are scanned. In this method 810, the first set of selective columns includes columns from 0 to n, where n is an integer, and the columns that are selected include every fourth column between column 0 to column n; a second set of selective columns includes columns from 0 to n, and where the columns that are selected include every fourth column between column 1 to column n; the third set of selective columns includes columns from 0 to n, and where the columns that are selected include every fourth column between column 2 to column n; and the fourth set of selective columns includes columns from 0 to n, and where the columns that are selected include every fourth column between column 3 to column n.

Figure 8B:
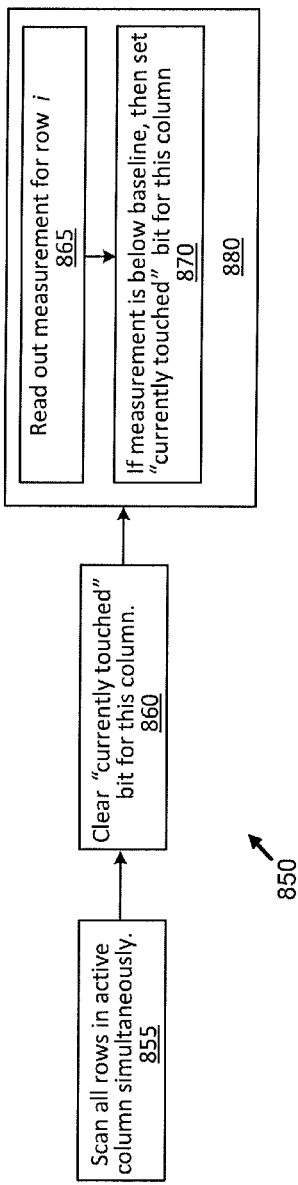
FIG. 8B depicts a flow diagram of an example of a method to scan a single column of the sensor.

FIG. 8B depicts a flow diagram of an example of a method 850 to scan a single column of the sensor. The method 810 involves scanning all rows in an active column simultaneously (855), clearing a "currently touched" bit for this column (860), and then performing another method 880, which can involve repeating some readouts and measurements for each row in the column (either sequentially or in parallel). The readouts and measurements involve a method 880 for reading out measurements for row i (865), and if the measurement is below the baseline, setting the "currently touched" bit for that column (870). The various scanned columns in FIGS. 8A and 8B may have multiple scans and their received signals averaged. The combined SNR can be higher than the SNR for a single scan.

Transmit Waveform Design for Noise Immunity

Techniques and implementations are described for providing noise immunity in the transmitted waveform for the capacitive touch sensing matrix.

If the touch sensor is used and/or implemented on top of an LCD, then the dominant source of noise is likely to be derived from the LCD operation. For example, an LCD can have around 1000×1000 pixels, can run around 100 frames per second, and can have a line scan frequency that is therefore around (100 frames/s)*(1000 lines/frame)=100,000 lines/s, or 100 kHz. This can be quite noticeable for large displays, such as for flat-screen televisions and large monitors. This can be close to the excitation frequency of the capacitive touch sensor, and may therefore be considered as in-band "noise." In some of these implementations, the excitation frequency can be selected such that the excitation waveform is orthogonal to the LCD's line-scan frequency over the integration period, for which the LCD's line-scan frequency includes the signal that is the dominant source of "noise."

In some implementations, if the transmitted waveform is an unmodulated carrier, then a frequency pair can be selected using the same or a similar process as used to select a frequency pair for orthogonal frequency shift keying (OFSK). For example, the frequencies f and 2 f can be orthogonal over a period 1/f, regardless of their relative phases. If the LCD has a line-scan frequency of 100 kHz, then the scan of the matrix can be conducted at either 50 kHz or 200 kHz, and the integration period can be selected as a multiple of either 20 us or 10 us. The noise around the line-scan frequency would then be entirely rejected. More complex waveforms can be designed in the frequency domain and then Fourier-transformed, or designed using the same algorithms as when choosing finite impulse response (FIR) filter coefficients for a particular frequency response. Since the correlation occurs in the digital domain, it may reject the noise only if the digital signals are an approximately accurate representation of the analog current into the row. If the ADC saturates, for example, then this will not be the case and all of the noise may not be rejected. To address the ADC saturation, the gain up to the ADC can be chosen so that the converter does not saturate with the maximum or highest expected noise level and the maximum or highest signal level.

Some other implementations may involve placing a notch filter in the receive path to reject the noise frequency. This can reject the noise, but if the excitation waveform still has energy around that frequency, then that component of the transmitted signal may be rejected by the receiver. This can mean that the energy used to transmit that component of the signal was not utilized. Some alternative implementations may design the transmitted signal specifically to have no component at the noise frequency, which can allow the system to make full use of its transmitted power while rejecting the noise.

For this approach, it can be useful if the noise frequency is known in advance, which is generally the case for an LCD. For instance, an LCD can run with a constant pixel clock and constant timings, independent of the timing of the input signal, and can resample the input signal to run within its internal timebase. But if the noise frequency was unknown in advance for some reason, or if it became necessary to reject some other narrowband noise source from the environment, then the implementations may involve selecting the transmit waveform adaptively, according to the spectrum of the noise measured on the receivers. In some implementations, thresholds for a detecting a touch can be selected adaptively, according to the magnitude of the received noise, so that if the ambient noise is high, then the threshold to detect the touch can be increased, and the likelihood for triggering a false touch can be reduced.

Figure 9:
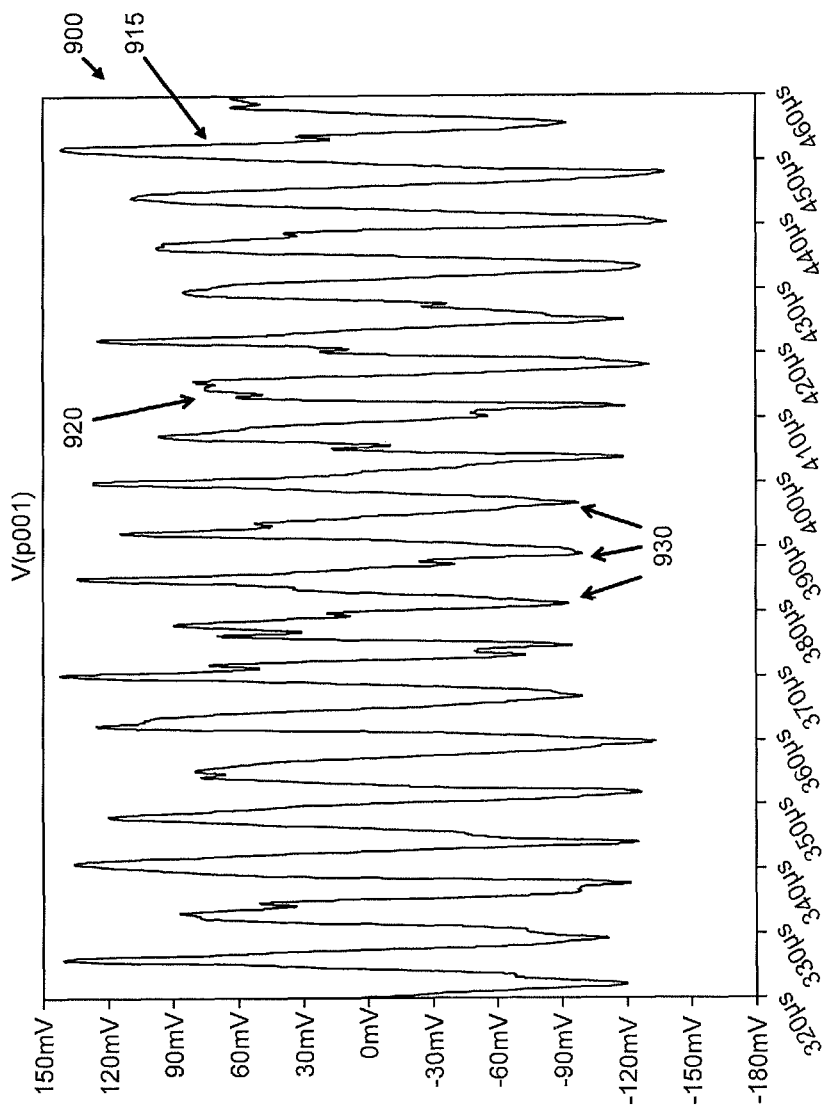
FIG. 9 depicts a diagram of an example of noise at an output of an analog front end of the system before demodulation is performed.

FIG. 9 depicts a diagram of an example of "noise" at an output of an analog front end of the system before demodulation is performed. The diagram 900 includes an example of a voltage waveform 915 of the voltage noise versus time. The voltage waveform 915 includes at least two additive components: a stochastic component 920 corresponding to random noise sources, and a deterministic component 930 corresponding to the LCD's horizontal refresh frequency. The diagram 900 involves noise taken from a simulated example.

Figure 10:
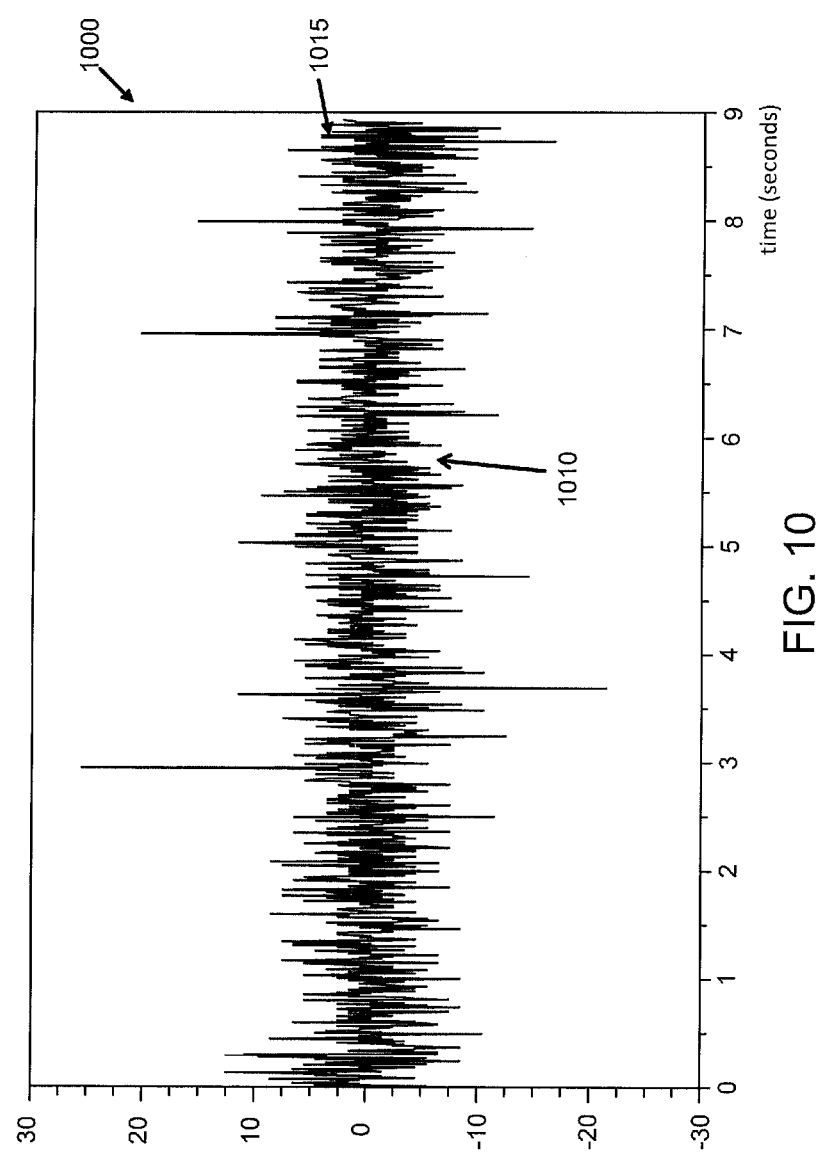
FIG. 10 depicts a diagram of an example of noise at the output of the analog front end after demodulation is performed with a good selection of an excitation waveform.

FIG. 10 depicts a diagram of an example of noise after demodulation is performed with a good selection of an excitation waveform. The diagram 1000 shows a waveform 1015 of the received noise versus time. The y-axis of the waveform 1015 can be in arbitrary units according to an ADC output, since its relative value (i.e., the SNR) is considered here. The noise appears with no visible deterministic structure, and appears to consist only of the stochastic component 1010. The magnitude of the noise is small (e.g., around 4 counts Root Mean Square (RMS)). The diagram 1000 involves noise taken from an example of measured data.

Figure 11:
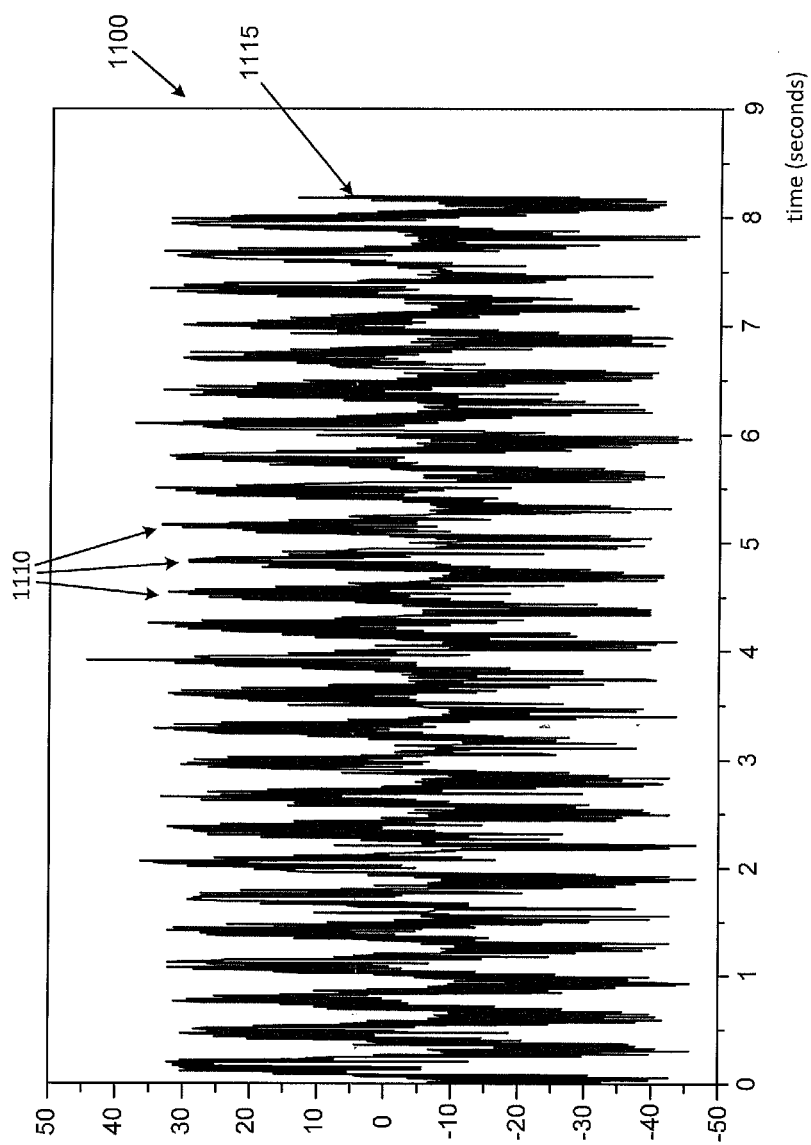
FIG. 11 depicts a diagram of an example of noise at the output of the analog front end after demodulation is performed with a bad selection of the excitation waveform.

FIG. 11 depicts a diagram of an example of noise after demodulation is performed with a bad selection of the excitation waveform. The diagram 1100 shows a waveform 1115 of the received noise versus time. The y-axis of the waveform 1115 is in the same arbitrary units as in FIG. 10. The noise in the waveform 1115 involves at least two additive components: a stochastic component corresponding to random noise sources, and a deterministic component 1110, which is due to the aliased horizontal refresh frequency of the LCD after demodulation. The magnitude of the noise in FIG. 11 is larger (e.g., around 20 counts RMS) than in FIG. 10. The diagram 1100 involves noise taken from an example of measured data.

Figure 12:
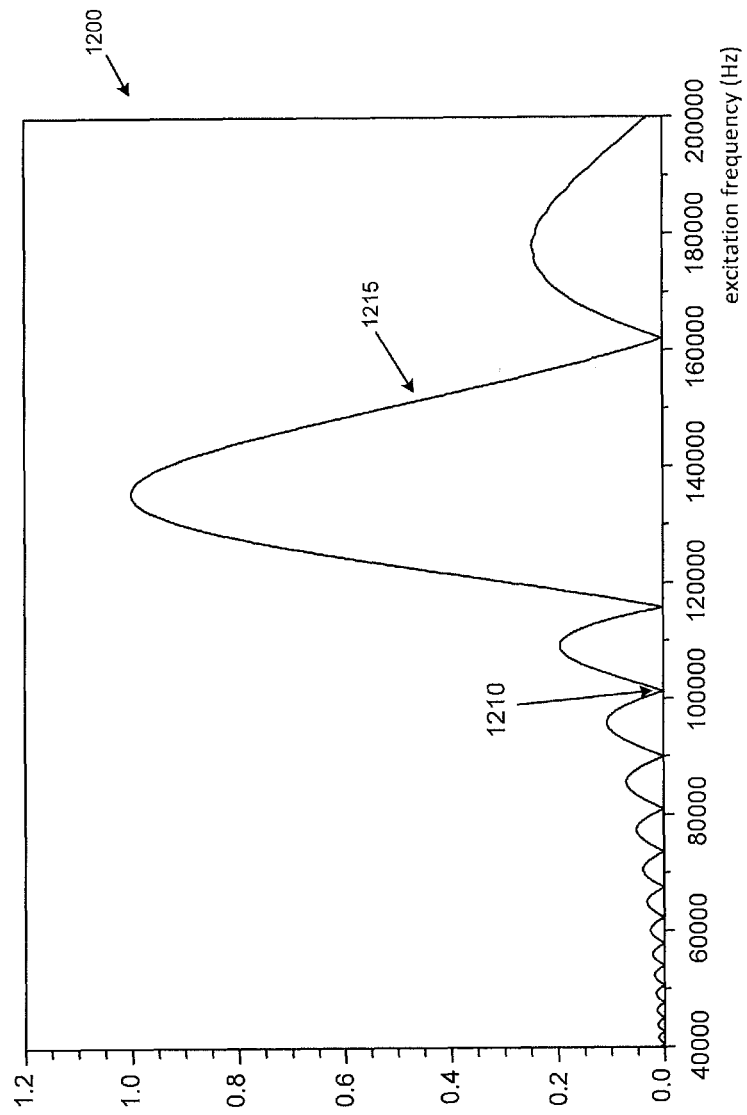
FIG. 12 depicts a diagram of an example of a correlation of noise frequency against excitation frequency over an integration period.

FIG. 12 depicts a diagram of an example of a correlation of noise frequency against excitation frequency over an integration period. The diagram 1200 shows a sinc-like waveform 1215 of the cross-correlation between the noise and excitation frequencies over an integration period, where the optimal choices for the good excitation frequencies occur at the nulls 1210 of the waveform 1215. The y-axis of the diagram has been normalized to a value of one when the noise and excitation frequencies are equal. In the waveform 1215, the noise frequency is 135 kHz, and the integration period is 6 cycles of excitation frequency.

In some example implementations on some LCD panels, a burst of broadband noise can be generated during a narrow slice of the full frame time. For instance, for one 55", 120 Hz panel, the broadband noise may be generated during about 150 us of that 8.3 ms frame. This noise may appear in the measured capacitance image as a particularly noisy set of columns since the frame is time-divided by column. These noisy columns can move within the capacitance image, for example, at the beat frequency between the LCD's frame rate and the capacitive touch sensor's frame rate. If the LCD and touch sensor are frequency locked, then the noisy columns can be stationary. If the LCD and touch sensor are phase locked, then the location of those noisy columns can be identified, and measurement can be halted during that time. This may slightly decrease the available integration time, but may improve the worst-case noise performance. The system can be phased locked by connecting directly to the LCD's pixel clock and synchronization (e.g., data enable, DE) signals. If that technique for phase locking is not possible, then the system can be phased locked by looking at the measured data, and identifying the highest-noise columns. A control system can then adjust the frame rate to place the highest-noise columns in the desired or target position. This technique does not have to have a connection to the LCD module.

Some implementations may transmit multiple orthogonal excitation waveforms simultaneously, for example, by using techniques similar to CDMA techniques. Such implementations may be able to choose all of the excitation waveforms orthogonal to the noise frequency. The noise frequency may be known in advance, and the excitation waveforms may be designed to be orthogonal to that known frequency. If the noise frequency is not known in advance, then the noise frequency may be measured using the receivers, and the excitation waveforms may be selected, such as being adaptively selected.

Excitation Voltage

The system's noise performance generally can be determined, for instance, by the signal to noise ratio at the receiver. As described above, various techniques can improve the SNR including correlating against the correct expected waveform, where the valid received energy is extracted from the signal, and choosing a waveform orthogonal to the noise to decrease the total received noise. Another technique to improve SNR can be to increase the transmit power. For instance, small capacitive touch sensors (e.g., around 4" diagonal distance) can operated at a standard logic voltage (e.g., around 3.3 V, or slightly higher), and larger touch screens (e.g., around 15" or larger diagonal distances) can operate around 10-20 V, for example. Because the SNR can scale with voltage, some implementations can improve the SNR by having a system that operates with a maximum transmit voltage of 200 V, for example. This can increase radiated emissions, which can be mitigated, for example, by limiting the slew rate of fast edges, or by modulating the transmitted signal with a noise-like (e.g., wideband) code. This can also increase the current through the user, but that current may be no more than tens of microamps, for example. This current can be much less than the threshold of sensation, which can be around 10 mA at the frequencies of interest. Because the threshold of sensation increases with frequency, as the sensation changes from tingling (due to interactions with the nerves) to warmth (due to I^2*R heating in the flesh), the high frequency may even permit an increase of the maximum acceptable current through the user. Additionally, if only one column is scanned at a time, and the user is touching only a small number of columns, then the average current is further reduced. This can mean, for example, that if the user is touching 3 columns in a 100-column sensor, then the average current can be 3/100 of the peak current.

Analog Front End

Techniques and implementations are described for designing analog front-end circuits for a capacitive touch sensing system.

Figure 13:
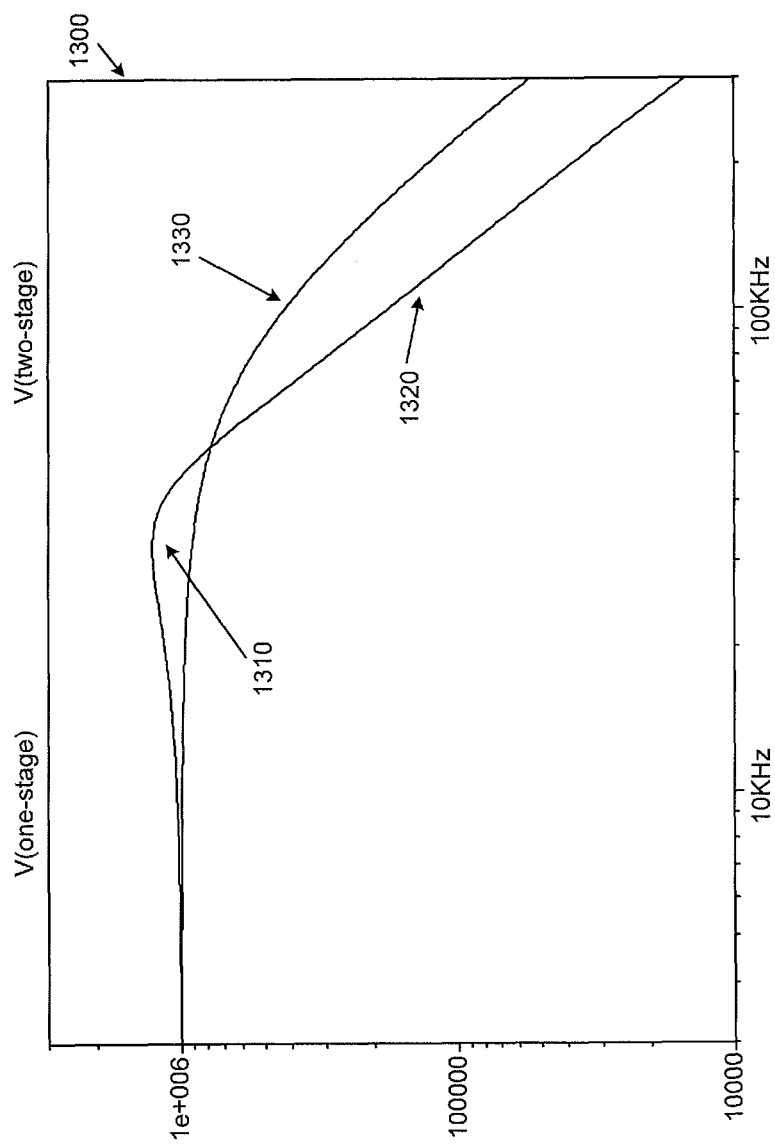
FIG. 13 depicts a diagram of an example of output responses from a one-stage front-end amplifier and a two-stage front-end amplifier.

FIG. 13 depicts a diagram of an example of output responses from a one-stage front-end amplifier and a two-stage front-end amplifier. The diagram 1300 shows a single-stage amplifier amplitude response 1320 and a two-stage amplifier amplitude response 1330. The first and second stage amplifiers are front-end amplifiers with a gain of around 1 V/uA, using 10 MHz gain*bandwidth operational amplifiers, and being loaded by a uniform RC line with a total capacitance C=800 pF, and resistance R=5 kOhm. The single stage amplifier amplitude response 1320 has undesired peaking 1310 in the gain, which correspond to ringing in the time domain.

Some implementations of front-end amplifiers may not attempt to take all of the transimpedance gain up front, because it may make it difficult to keep the amplifier stable with a large capacitance to ground at the input. These implementations may take a small transimpedance gain up front, and follow that small transimpedance gain with voltage gain to improve performance. The initial transimpedance gain can be chosen large enough such that the device and other noise of that first stage does not dominate, since that noise will be multiplied by the voltage gain of the second stage. For example, if total noise, which can be referred to the output of the second stage, is expected to be around 100 mV RMS, and the second stage has a gain of 10 V/V, then the first stage can have the device noise (and noise from other noise sources, including noise coupled from the power supplies, for example) well under 10 mV.

FIG. 14A depicts a diagram of an example of a two-stage front-end amplifier circuit. In the circuit 1400A, the first amplifier IC1A has a reference voltage VREF on a non-inverting input terminal 3, and an input IN0 at an inverting input terminal 2, with a first feedback capacitor Cf and a first feedback resistor Rf connected between the inverting input terminal 2 and an output terminal 1 of the amplifier IC1A. The output terminal 1 is connected in series to a capacitor Ca, which is serially connected to resistor Ra. The second amplifier IC1B has a non-inverting terminal 5 connected to the reference voltage VREF and an inverting terminal 6 connected to the resistor Ra. A second feedback capacitor Cb and a second feedback resistor Rb is connected between the inverting input terminal 6 and an output terminal 7 of the second amplifier IC1B.

The implementation of FIG. 14A can include a high-quality pure analog front end, using linear amplifiers. This configuration can maintain the input voltage very close to a constant value, and can tolerate significant capacitance to ground. In FIG. 14A, a row of the sensor can be connected to the input IN0. This design may be a transimpedance amplifier with the gain being determined by Rf and Cf. This amplifier 1400A may be regarded as an integrator, with gain (in units of V/A) $1/(s*Cf)$, where $s=j*2*pi*f$ is the frequency of the input signal. The resistor Rf may be chosen to place the time constant Rf*Cf faster than the integration period, to stop integrator drift on the input. For example, with an excitation frequency around 100 kHz, that time constant may be around (2.2 nF)*(2.2 k)=4.8 us, which is faster than the period of 10 us. In combination with the capacitor in the sensor matrix, this configuration can essentially form a voltage divider, so if the transmit voltage is Vt, and the sensor capacitance under test is Cut, then amplifier IC1A can output a voltage Vt*Cut/Cf.

By taking a smaller transimpedance gain, and following that with voltage gain, the closed-loop transfer function can be stable and ringing or oscillation can be avoided, even in the presence of large capacitance to ground at the input (as will occur when the traces are long in large displays, for example, where values may be in the hundreds of pF). In some implementations, the initial transimpedance gain can be chosen large enough that the opamp's device noise, and any coupled noise within the receiver circuit, are insignificant compared to the total system noise.

In some implementations, for example, the device and other noise of amplifier IC1A can be the most important source of noise generated within the system, since that noise is amplified by the gain of amplifier IC1B. In one example of a design, this may correspond to a capacitance Cf of around 2.2 nF, resistance Rf of around 1.5 kOhms, and a voltage gain Rb/Ra of around 20. In some implementations, the capacitor Ca can be chosen to produce a very low gain around 60 Hz, where noise coupled from the user's finger may have amplitude ten or more times as great as that of the signal, for example.

Figure 14B:
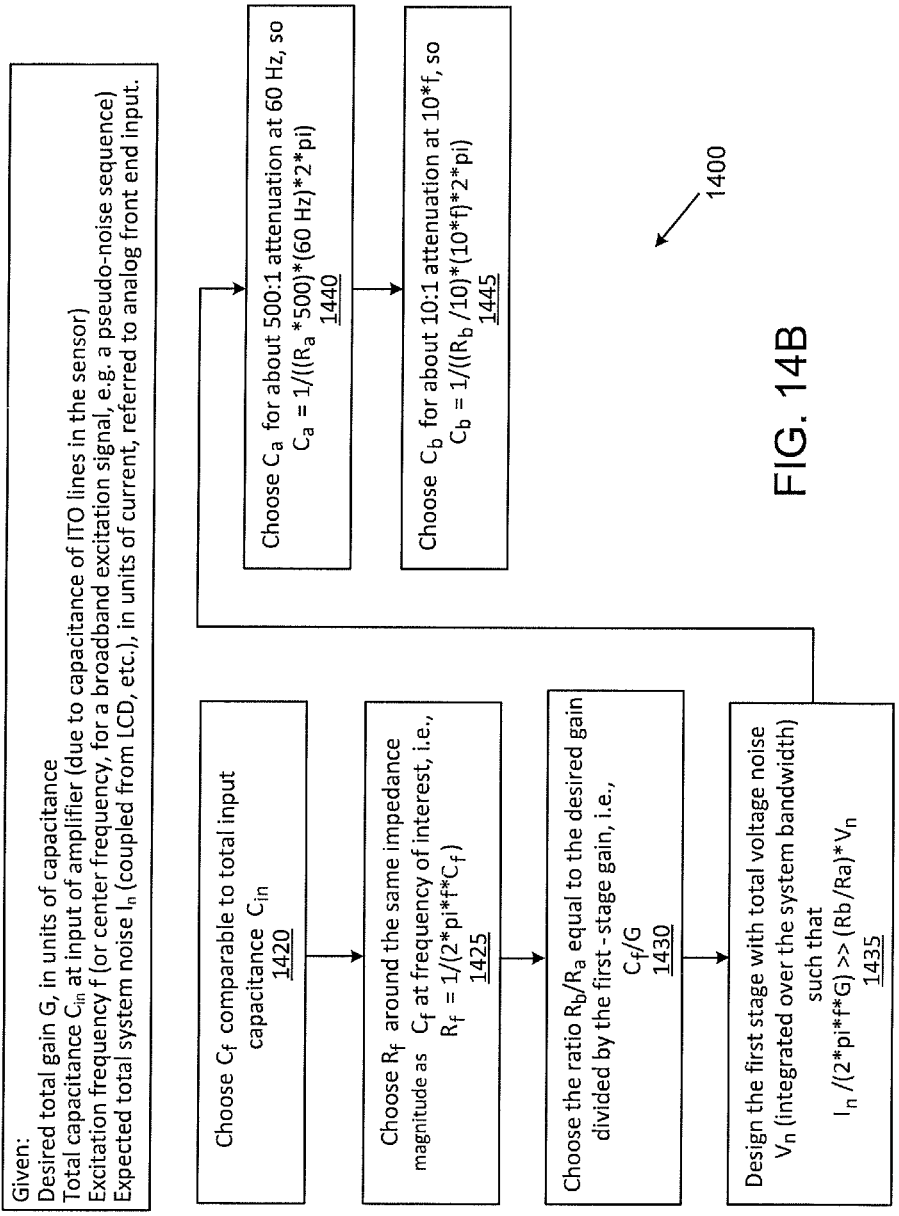
FIG. 14B depicts a flow diagram of an example for designing a front-end amplifier with appropriate values of capacitance and resistance for stability.

FIG. 14B depicts a flow diagram of an example for designing a front-end amplifier with appropriate values of capacitance and resistance for stability. In the method of the flow diagram 1400, parameters include the desired total gain G, in which the units can be in capacitance, and the total capacitance $C_{in}$ at the input of the amplifier, which can be modeled as the capacitance of the ITO trace lines in the sensor. Other parameters include the excitation frequency f (or a center frequency for a broadband excitation signal, e.g., pseudo-noise sequence), and the expected total system noise $I_n$, which may be coupled from the LCD, in units of current, and can be referred to the analog front-end input.

The method involves choosing a $C_f$ comparable to the total input capacitance $C_{in}$ (1420), and choosing $R_f$ around the same impedance magnitude as $C_f$ at the frequency of interest, e.g., $R_f = 1/(2*pi*f*C_f)$ (1425). The method involves choosing a ratio $R_b/R_a$ that is equal to the desired/target gain divided by the first-stage gain, e.g., $C_f/G$ (1430), and designing the first stage with total voltage noise $V_n$ (integrated over the system bandwidth) such that $I_n/(2*pi*f*G) >> (R_b/R_a)*V_n$ (1435). The method also involves choosing $C_a$ for about 500:1 attenuation at 60 Hz, so that capacitance $C_a = 1/((R_a*500)*(60 Hz)*2*pi)$ (1440). Then, the method involves choosing $C_b$ for about 10:1 attenuation at 10*f, so that capacitance $C_b = 1/((R_b/10)*(10*f)*2*pi)$ (1445).

Some of the described embodiments of the subject matter and the operations can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful.

What is claimed is:

1. A method performed by a data processing apparatus associated with a sensor, the sensor comprising a plurality of trace lines oriented in a matrix configuration, a front end interface, a plurality of transmitters coupled with the front end interface, and a plurality of receivers, wherein respective transmitters correspond to and are coupled with a first location of respective trace lines, and respective receivers are coupled with a second location of the respective trace lines, the method comprising:
   determining orthogonal excitation waveforms having an orthogonal waveform sequence, wherein the orthogonal excitation waveforms are orthogonal to each other and define an integration period that is longer than a time constant of a feedback resistor and a feedback capacitor connected in parallel between an input of a transimpedance amplifier and an output of the transimpedance amplifier;
   simultaneously transmitting, on each of at least two of the transmitters, one of the orthogonal excitation waveforms such that at least two of the transmitters are configured to transmit respective orthogonal waveform sequences for a duration equal to an integration time, wherein the transmitting occurs on less than all transmitters in the sensor, and wherein a length of the integration time is determined based on a number of transmitters simultaneously transmitting the one of the orthogonal excitation waveforms, the length of the integration time increasing as the number of transmitters simultaneously transmitting increases;
   receiving at least two of the orthogonal excitation waveforms at least at two of the receivers, wherein each of the at least two orthogonal excitation waveforms are received at one of the respective receivers;
   receiving information for at least an expected received waveform; and
   for each of the at least two receivers, correlating the received excitation waveform against the expected received waveform.

2. The method of claim 1, wherein the sensor comprises a capacitive touch sensor, wherein the orthogonal excitation waveforms are orthogonal to noise in the sensor.

3. The method of claim 1, wherein the matrix configuration comprises n columns of trace lines, and wherein each simultaneous transmission of the transmitters occurs in the integration time, the method further comprising determining a number of integration times as a function of a number of simultaneous transmissions from at least two of the transmitters.

4. The method of claim 1, wherein the sensor is configured to be located within a physical proximity to a liquid crystal display to at least have an ability to interact with the liquid crystal display, wherein the liquid crystal display comprises a scan line frequency that is about 30 kHz to 135 kHz.

5. The method of claim 1, further comprising performing code division multiplexing, wherein each trace line in a group of four trace lines comprises a distinct code for the orthogonal waveform sequences.

6. The method of claim 5, wherein the code division multiplexing comprises a Manchester-coded Hadamard sequence.

7. The method of claim 1, wherein determining the orthogonal excitation waveforms comprises:
   selecting a first frequency for modulation;
   generating a pseudo-noise sequence around the first frequency;
   generating a carrier signal for the pseudo-noise sequence; and
   modulating a number of cycles of the carrier signal around the first frequency with the pseudo-noise sequence.

8. The method of claim 7, wherein the first frequency is around 100 kHz, and wherein the number of carrier signals is less than ten.

9. The method of claim 7, further comprising:
   identifying a frequency associated with noise in the sensor; and
   selecting at least one of the orthogonal excitation waveforms to be orthogonal to the frequency associated with the noise.

10. The method of claim 1, wherein the determined orthogonal excitation waveforms are a function of a frequency for modulation and a pseudo-noise sequence at the frequency for modulation.

11. The method of claim 1, further comprising:
   taking a noise spectrum of noise associated with the sensor;
   taking a measurement of noise in the sensor by evaluating the noise spectrum associated with the sensor;
   identifying the noise based on the evaluation of the noise spectrum; and
   determining the orthogonal excitation waveforms by making the orthogonal excitation waveforms orthogonal to the identified noise in the sensor.

12. The method of claim 11, further comprising:
continuing to take the measurement to identify the noise that is orthogonal to the orthogonal excitation waveforms by identifying the noise from the highest noise source in the noise spectrum over a time frame; and
adaptively determining the orthogonal excitation waveforms by using the noise associated with the highest noise source that is continuously identified in the noise spectrum.

13. The method of claim 11, further comprising:
periodically taking the measurement to identify the noise that is orthogonal to the orthogonal excitation waveforms by identifying the noise from the highest noise source in the noise spectrum; and
adaptively determining the orthogonal excitation waveforms by using the noise associated with the highest noise source that is periodically identified in the noise spectrum.

14. The method of claim 11, wherein the identified noise is associated with a frequency of operation of a cold-cathode fluorescent backlight or a frequency associated with a liquid crystal display.

15. The method of claim 1, wherein the sensor comprises a capacitive touch sensor, the capacitive touch sensor comprising a front-end circuit, the method further comprising:
preparing an input voltage for transmitting at an output of the front-end circuit for the capacitive touch sensor, the front-end circuit comprising at least a two-stage circuit with the first stage being configured to produce a transimpedance gain, and the second stage being configured to produce a voltage gain, wherein the preparation of the input voltage comprises:
producing the transimpedance gain in the first stage of the front-end circuit by configuring the first stage as an integrator circuit;
generating an output signal at the first stage by performing voltage division of the input voltage; and
amplifying the output signal of the first stage of the front-end circuit with the voltage gain of the second stage of the front-end circuit to produce an output signal for the second stage of the front-end circuit, wherein the first stage comprises noise at a noise level such that the output signal for the second stage of the front-end circuit includes the noise of the first stage amplified by a function of the voltage gain of the second stage, and the noise at the output signal of the second stage is less than noise of the sensor that is derived from a liquid crystal display frequency or a frequency of operation of a cold-cathode fluorescent backlight, and
wherein a closed-loop transfer function of the front-end circuit is stable.

16. A system comprising:
a sensor, wherein the sensor comprises:
a plurality of trace lines oriented in a matrix configuration,
a front end interface,
a front-end circuit comprising at least a two-stage circuit with a first stage comprising a first transimpedance amplifier configured to produce a transimpedance gain based on a first feedback resistor and a feedback capacitor and a second stage comprising a second transimpedance amplifier configured to produce a voltage gain based on a serially-connected resistor and a second feedback resistor, the first feedback resistor connected in parallel to the feedback capacitor and configured to provide a time constant that is less than an integration period, the serially-connected resistor connected in series to a serially-connected capacitor between the first transimpedance amplifier and the second transimpedance amplifier, the second feedback resistor connected between an input terminal and an output terminal of the second transimpedance amplifier,
a plurality of transmitters coupled with the front end interface, and
a plurality of receivers,
wherein respective transmitters correspond to and are coupled with a first location of respective trace lines, and respective receivers are coupled with a second location of the respective trace lines,
the system being configured to:
determine orthogonal excitation waveforms having an orthogonal waveform sequence and wherein the orthogonal excitation waveforms are orthogonal to each other and the frequency of the orthogonal excitation waveforms define the integration period;
simultaneously transmit, on each of at least two of the transmitters, one of the orthogonal excitation waveforms such that at least two of the transmitters are configured to transmit respective orthogonal waveform sequences, wherein the transmitting occurs on less than all transmitters in the sensor, the length of the integration period increasing as the number of transmitters simultaneously transmitting increases;
receive at least two of the orthogonal excitation waveforms at at least two of the receivers, wherein each of the at least two orthogonal excitation waveforms are received at one of the respective receivers;
receive information for at least an expected received waveform; and
for each of the at least two receivers, correlate the received excitation waveform against the expected received waveform.

17. The system of claim 16, wherein the sensor comprises a capacitive touch sensor, wherein the orthogonal excitation waveforms are orthogonal to noise in the sensor.

18. The system of claim 16, wherein the matrix configuration comprises n columns of trace lines, and wherein the system is configured such that each simultaneous transmission of the transmitters occurs in an integration time, and the system is further configured for determining a number of integration times as a function of a number of simultaneous transmissions from at least two of the transmitters.

19. The system of claim 16, wherein the sensor is configured to be located within a physical proximity to a liquid crystal display to at least have an ability to interact with the liquid crystal display, wherein the liquid crystal display comprises a scan line frequency that is about 30 kHz to 135 kHz.

20. The system of claim 16, wherein the system is configured for performing code division multiplexing, wherein each trace line in a group of four trace lines comprises a distinct code for the orthogonal waveform sequences.

21. The system of claim 20, wherein the code division multiplexing comprises a Manchester-coded Hadamard sequence.

22. The system of claim 16, wherein the system is configured for determining the orthogonal excitation waveforms by:
selecting a first frequency for modulation;
generating a pseudo-noise sequence around the first frequency;
generating a carrier signal for the pseudo-noise sequence; and
modulating a number of cycles of the carrier signal around the first frequency with the pseudo-noise sequence.

23. The system of claim 22, wherein the first frequency is around 100 kHz, the number of carrier signals is less than ten, and wherein the serially-connected capacitor is selected to produce a 500:1 attenuation at 60 Hz and a second feedback capacitor is selected to produce a 10:1 attenuation at ten times the frequency of the orthogonal excitation waveforms.

24. The system of claim 22, wherein the system is configured for:
identifying a frequency associated with noise in the sensor; and
selecting at least one of the orthogonal excitation waveforms to be orthogonal to the frequency associated with the noise.

25. The system of claim 16, wherein the determined orthogonal excitation waveforms are a function of a frequency for modulation and a pseudo-noise sequence at the frequency for modulation.

26. The system of claim 16, wherein the system is configured for:
taking a noise spectrum associated with the sensor;
taking a measurement of noise in the sensor by evaluating the noise spectrum associated with the sensor;
identifying the noise based on the evaluation of the noise spectrum; and
determining the orthogonal excitation waveforms by making the orthogonal excitation waveforms orthogonal to the identified noise in the sensor.

27. The system of claim 26, wherein the system is configured for:
continuing to take the measurement to identify the noise that is orthogonal to the orthogonal excitation waveforms by identifying the noise from the highest noise source in the noise spectrum over a time frame; and
adaptively determining the orthogonal excitation waveforms by using the noise associated with the highest noise source that is continuously identified in the noise spectrum.

28. The system of claim 26, wherein the system is configured for:
periodically taking the measurement to identify the noise that is orthogonal to the orthogonal excitation waveforms by identifying the noise from the highest noise source in the noise spectrum; and
adaptively determining the orthogonal excitation waveforms by using the noise associated with the highest noise source that is periodically identified in the noise spectrum.

29. The system of claim 26, wherein the system comprises a cold-cathode fluorescent backlight or a liquid crystal display, wherein the identified noise is associated with a frequency of operation of the cold-cathode fluorescent backlight or a frequency associated with the liquid crystal display.

30. The system of claim 16, wherein the sensor comprises a capacitive touch sensor, wherein the capacitive touch sensor comprises the front-end circuit, and the system is further configured for:
preparing an input voltage for transmitting at an output of the front-end circuit for the capacitive touch sensor, the second stage of the front end circuit being configured to produce the voltage gain, wherein the preparation of the input voltage comprises:
producing the transimpedance gain in the first stage of the front-end circuit by configuring the first stage as an integrator circuit;
generating an output signal at the first stage by performing voltage division of the input voltage; and
amplifying the output signal of the first stage of the front-end circuit with the voltage gain of the second stage of the front-end circuit to produce an output signal for the second stage of the front-end circuit,
wherein the first stage comprises noise at a noise level such that the output signal for the second stage of the front-end circuit includes the noise of the first stage amplified by a function of the voltage gain of the second stage, and the noise at the output signal of the second stage is less than noise of the sensor that is derived from a liquid crystal display frequency or a frequency of operation of a cold-cathode fluorescent backlight, and
wherein a closed-loop transfer function of the front-end circuit is stable.

31. A system comprising:
a sensor, wherein the sensor comprises:
a plurality of trace lines oriented in a matrix configuration,
a front end interface,
a plurality of transmitters coupled with the front end interface, and
a plurality of receivers,
wherein respective transmitters correspond to and are coupled with a first location of respective trace lines, and respective receivers are coupled with a second location of the respective trace lines,
means for determining orthogonal excitation waveforms having an orthogonal waveform sequence including taking a noise spectrum associated with the sensor and taking a measurement of noise in the sensor by evaluating the noise spectrum associated with the sensor, and wherein the orthogonal excitation waveforms are orthogonal to each other and to the noise in the sensor;
identifying the noise based on the evaluation of the noise spectrum; and
determining the orthogonal excitation waveforms by making the orthogonal excitation waveforms orthogonal to the identified noise in the sensor;
means for simultaneously transmitting, on each of at least two of the transmitters, one of the orthogonal excitation waveforms such that at least two of the transmitters are configured to transmit respective orthogonal waveform sequences for a duration equal to an integration time, wherein the transmitting occurs on less than all transmitters in the sensor, and wherein a length of the integration time is determined based on a number of transmitters simultaneously transmitting the one of the orthogonal excitation waveforms the length of the integration time increasing as the number of transmitters simultaneously transmitting increases;
means for receiving at least two of the orthogonal excitation waveforms at at least two of the receivers, wherein each of the at least two orthogonal excitation waveforms are received at one of the respective receivers;
means for receiving information for at least an expected received waveform; and
for each of the at least two receivers, means for correlating the received excitation waveform against the expected received waveform.

32. The method of claim 1, wherein the sensor comprises a capacitive touch sensor.

* * * * *